(12) United States Patent
Johnston et al.

(10) Patent No.: US 7,183,502 B1
(45) Date of Patent: Feb. 27, 2007

(54) EXTENDABLE CHANNEL UNIT CONTAINING A CONDUCTOR

(75) Inventors: David H. Johnston, 368 NW. 23rd St., Boca Raton, FL (US) 33431; Richard A. Clark, Alpharetta, GA (US)

(73) Assignee: David H. Johnston, Boca Raton, FL (US)

( * ) Notice: Subject to any disclaimer, the term of this patent is extended or adjusted under 35 U.S.C. 154(b) by 0 days.

(21) Appl. No.: 11/409,815

(22) Filed: Apr. 24, 2006

Related U.S. Application Data

(63) Continuation-in-part of application No. 10/836,895, filed on Apr. 30, 2004, now Pat. No. 7,034,221, application No. 11/409,815, which is a continuation-in-part of application No. PCT/US2005/039998, filed on Nov. 3, 2005.

(60) Provisional application No. 60/488,393, filed on Jul. 18, 2003, provisional application No. 60/489,562, filed on Jul. 23, 2003, provisional application No. 60/494,888, filed on Aug. 13, 2003, provisional application No. 60/561,047, filed on Apr. 9, 2004, provisional application No. 60/624,825, filed on Nov. 4, 2004.

(51) Int. Cl.
*H02G 3/04* (2006.01)

(52) U.S. Cl. .................. 174/480; 174/481; 174/68.3; 174/95; 174/72 R; 439/207; 439/209; 52/220.7

(58) Field of Classification Search ........... 174/480, 174/481, 68.1, 68.3, 95, 96, 99 R, 72 R, 174/70 C, 88 R, 97; 220/3.2, 3.3, 3.8; 439/207, 439/208, 209, 210, 211, 212, 213, 214, 215, 439/216; 138/109, 155, 96 T, 111, 178, 177, 138/103; 285/907; 52/220.1, 220.3, 220.5, 52/220.7

See application file for complete search history.

(56) References Cited

U.S. PATENT DOCUMENTS

| | | | |
|---|---|---|---|
| 1,953,662 A | 6/1934 | Knapp | |
| 2,166,516 A | 7/1939 | Bainbridge | |
| 2,175,144 A | 10/1939 | Davidson | |
| 2,411,696 A | 11/1946 | Gerspacher et al. | |
| 3,262,083 A | 7/1966 | Gooding | |
| 3,433,889 A | 3/1969 | Devries, Jr. | |
| 3,573,344 A | 4/1971 | Snyder | |
| 3,616,587 A | 11/1971 | Schlafly, Jr. | |
| 3,676,974 A | 7/1972 | Daly | |

(Continued)

*Primary Examiner*—Angel R. Estrada
(74) *Attorney, Agent, or Firm*—David G. Maire; Beusse Wolter Sanks Mora & Maire, P.A.

(57) ABSTRACT

An extendable channel unit such as molding unit (21) has a pair of telescopically arranged relatively extendable conduits (55, 75) with a conductor (22) interconnected in conductive relation between the conduits, with an intermediate section (137) of the conductor effective to accommodate the relative extension of the conduits. The intermediate section may include a sinuous configuration (133) or expandable coils (139). The channel unit may be installed along a wall (145) or other surface for decoratively covering the installation of the conductor for connection with an operated device (153). The channel unit may be installed into an extendable ramp (163) when installed along a floor, such as within a doorway (171). Two joints (308, 310) provide freedom of rotation about the conductor axis on opposed sides of an angled joint (312) that provides freedom of rotation about an axis disposed at a 45° angle to the axis of the conductor. This combination permits the unit to be configured to pass around both inside and outside corners, as well as to form upward and downward right angles along a straight wall.

12 Claims, 19 Drawing Sheets

U.S. PATENT DOCUMENTS

| | | |
|---|---|---|
| 3,721,762 A | 3/1973 | Gooding |
| 3,786,171 A | 1/1974 | Shira |
| 3,792,189 A | 2/1974 | Stengel et al. |
| 4,017,137 A | 4/1977 | Parks |
| 4,423,284 A | 12/1983 | Kaplan |
| 4,534,147 A | 8/1985 | Cristell |
| 4,629,826 A | 12/1986 | Thomas |
| 4,800,695 A | 1/1989 | Menchetti |
| 4,860,168 A | 8/1989 | Wiljanen et al. |
| 4,875,871 A * | 10/1989 | Booty et al. ............... 174/72 C |
| 4,944,687 A * | 7/1990 | Mailly et al. ................ 439/207 |
| 4,952,163 A | 8/1990 | Dola et al. |
| 5,024,614 A | 6/1991 | Dola et al. |
| 5,041,002 A | 8/1991 | Byrne |
| 5,095,822 A | 3/1992 | Martin |
| 5,149,017 A | 9/1992 | McEntire et al. |
| 5,160,811 A * | 11/1992 | Ritzmann .................. 174/68.3 |
| 5,267,367 A | 12/1993 | Wegmann, Jr. |
| 5,336,849 A | 8/1994 | Whitney |
| 5,357,053 A | 10/1994 | Manaras |
| 5,556,059 A | 9/1996 | Maeda et al. |
| 5,566,622 A | 10/1996 | Ziaylek et al. |
| 5,661,263 A * | 8/1997 | Salvaggio .................. 174/68.3 |
| 5,732,747 A | 3/1998 | Holliday |
| 5,746,389 A | 5/1998 | Willmann |
| 5,823,655 A | 10/1998 | Brooks |
| 6,173,542 B1 | 1/2001 | Wright |
| 6,191,363 B1 | 2/2001 | Samuels |
| 6,202,380 B1 | 3/2001 | Trutwin et al. |
| 6,248,411 B1 | 6/2001 | Warfel |
| 6,274,814 B1 | 8/2001 | Iavarone |
| 6,323,421 B1 | 11/2001 | Pawson et al. |
| 6,444,903 B2 * | 9/2002 | Saeki et al. .................. 174/480 |
| 6,521,835 B1 | 2/2003 | Walsh |
| 6,545,214 B2 | 4/2003 | Russell et al. |
| 6,573,451 B2 * | 6/2003 | Komiya et al. ............. 174/68.1 |
| 6,585,221 B1 | 7/2003 | Gretz |
| 6,689,953 B2 * | 2/2004 | Baldwin ....................... 174/50 |
| 6,872,888 B2 * | 3/2005 | Santelli, Jr. ................. 174/68.1 |
| 2002/0144833 A1 | 10/2002 | Russell et al. |
| 2003/0089515 A1 | 5/2003 | Federsplel et al. |
| 2003/0106702 A1 | 6/2003 | Seamans et al. |

* cited by examiner

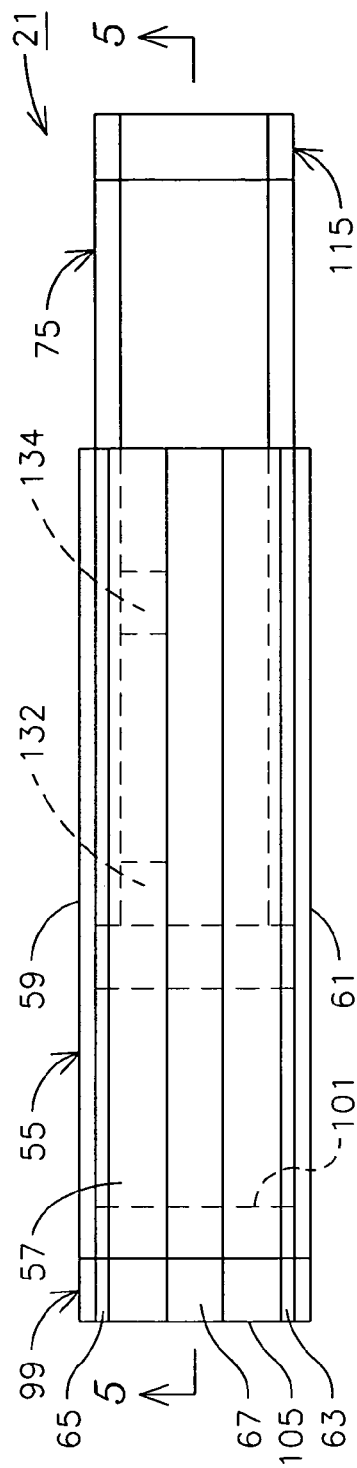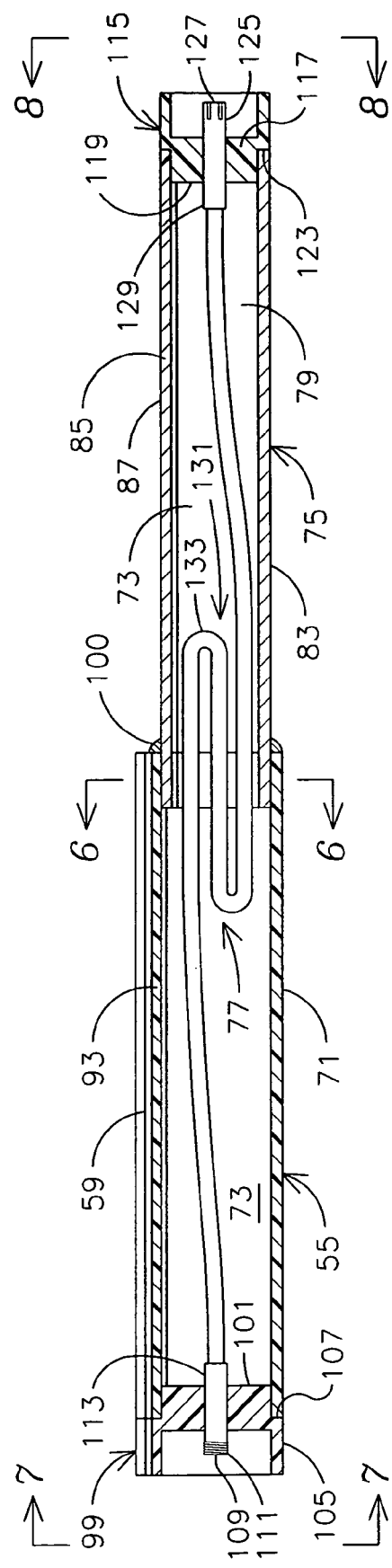

EXTENDABLE CHANNEL UNIT CONTAINING A CONDUCTOR

CROSS-REFERENCE TO RELATED APPLICATIONS

This application is a continuation-in-part and claims priority benefit of U.S. patent application Ser. No. 10/836,895 filed 30 Apr. 2004 now U.S. Pat. No. 7,034,221, which in turn claimed benefit of the filing dates of U.S. provisional patent application 60/488,393 filed 18 Jul. 2003; 60/489,562 filed 23 Jul. 2003; 60/494,888 filed 13 Aug. 2003; and 60/561,047 filed 9 Apr. 2004. This application is also a continuation-in-part and claims priority benefit of international application PCT/US2005/039998 filed 3 Nov. 2005, which in turn claimed priority to U.S. provisional patent application 60/624,825 filed 4 Nov. 2004. All of the above-cited applications are incorporated by reference herein.

FIELD OF THE INVENTION

This invention relates generally to the field of channel units utilized in conductor systems, and in particular, to such channel units used as room molding.

BACKGROUND OF THE INVENTION

In the past, various different moldings have been provided to conform an electrical system in a room. For instance, U.S. Pat. No. 2,175,144 describes long and short molding units having a set of hollow conductors extending there through. A combination of short and long units must be selected in an attempt to accommodate various room sizes. U.S. Pat. No. 2,441,698 illustrates a molding carrying a pair of conductors. If it is desired to shorten the molding, the molding must be sawed or otherwise cut. These systems are cumbersome to work with and are not easily adapted to accommodate a variety of room applications.

BRIEF DESCRIPTION OF THE DRAWINGS

FIG. 4 is a plan view of the above-mentioned extendable channel unit in one form of the invention; which is illustrated in its retracted position.

FIG. 5 is a sectional view taken along section line 5—5 in FIG. 4;

Figure 1:
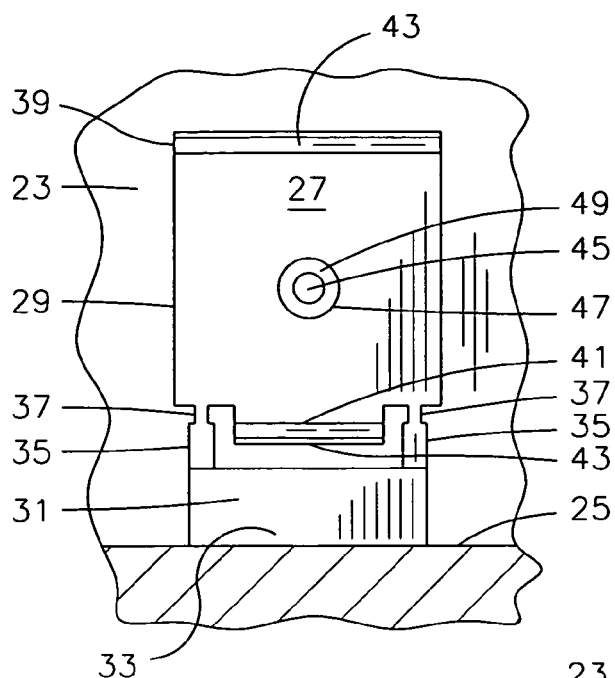
FIG. 1 is a plan view of a mounting device, which may be utilized with an extendable channel unit along a wall of a room in one form of the invention.

Corresponding reference characters indicate corresponding parts through the several views of the drawings. The exemplifications set out herein illustrate the preferred embodiments of the invention in several forms thereof and such exemplifications are not to be construed as limiting the scope of the disclosure or the scope of the invention in any manner.

DETAILED DESCRIPTION OF THE INVENTION

Figure 2:
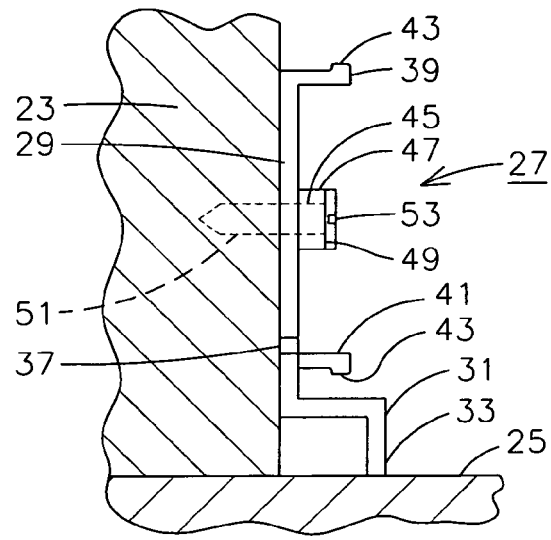
FIG. 2 is partial sectional view the assembled sections of the mounting device secured to the wall of the room.
Figure 3:
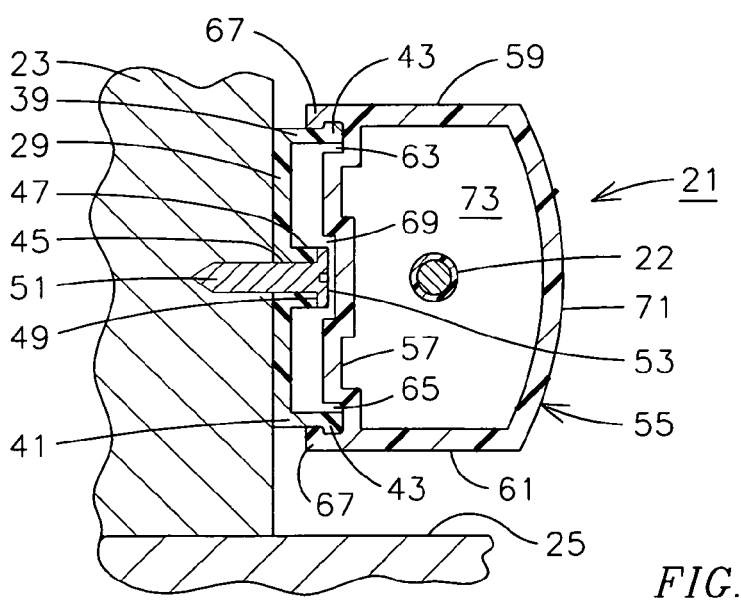
FIG. 3 is a sectional view showing the extendable channel unit releasably mounted to the mounting section of the mounting device and extending along the wall in predetermined space apart relation from a reference surface.

With reference now to FIGS. 1–3, there is illustrated in one form of the invention a method of assembling an extendable channel unit such as molding unit 21 along a wall 23 of a room with respect to a preselected reference surface 25 associated with the wall, with the channel unit having a conductor 22 therein. Reference surface 25 may be defined by a floor or the top edge of a floor molding or the like for instances associated with wall 23. A mounting device 27 for extendable channel unit 21 may be formed of a resinous material, such as plastic or the like for instance having the desired strength and resilient characteristics. Other known materials may be used, such as wood, metal, composites, etc. The mounting device 27 includes a mounting section 29 and an integrally formed separable reference section 31 depending there from with the reference section having a distal end 33 arranged in preselected spaced apart relation from the mounting selection. Reference section 31 is connected to mounting section 29 by a pair of laterally spaced apart arms 35, and the arms each have notches 37 providing predetermently weakened areas therein to enhance separation of the reference section from the mounting section, as further discussed hereinafter. A pair of vertically spaced-apart mounting flanges 39, 41 extended from mounting section 29 terminating in enlarged gripping ends or ledges 43, respectively. A mounting opening or hole 45 spaced between the mounting flanges is provided through the mounting section. To complete the description of mounting device 27, a cylindrical extension 47 is concentrically arranged about mounting hole 45 so as to be spaced between mounting flanges 39, 41, and the cylindrical extension terminates in an annular surface 49.

In the practice of the aforementioned assembly method, mounting device 27 is associated in a preselected position along wall 23 by placing the engaging mounting section 29 of the mounting device against the wall. During the placement of the mounting section, distal end 33 of reference section 31 is seated or otherwise abutted against reference surface 25, as best seen in FIGS. 1 and 2. It may be noted that the seating of reference section 31 with reference surface 25 spaces or locates mounting section 29 in predetermined position on wall 23 in spaced relation with the reference surface. When mounting device 27 is disposed in its preselected position on wall 23, as discussed above, a screw 51 is passed through mounting hole 45 and cylindrical extension 47 into threaded or mounting relation with wall 23 with a head 53 of screw 51 being disposed in abutment with annular surface 49 on the cylindrical extension, as best seen in FIG. 2. The abutment of screw head 51 with annual surface 49 in response to the threaded engagement of screw 50 with wall 23 effects the securement of mounting device 27 in its preselected position to the wall. While screw 50 is disclosed herein securing mounting device 27 to wall 25, it is contemplated that various other means, such as an adhesive or a nail or the like for instance, may be utilized to effect the securement of the mounting device to the wall.

Subsequent to the securing of mounting devices 27 to wall 23 in the manner discussed hereinabove, reference section 31 of the mounting device may be separated or otherwise disassociated from mounting section 29. In order to effect the separation of reference section 31 from mounting section 29, the reference section may be manually moved to cause arms 35 thereof to be snapped or otherwise broken away from the mounting section generally at the purposely weakened notches 37, as seen in FIG. 3. It may be noted that the separation of reference section 31 from mounting section 29 may occur prior to or subsequent to the mounting of extendable molding unit 21 to the mounting section, as discussed in detail hereafter.

Extendable molding unit 21 may be mounted or otherwise secured or associated with the mounting section so as to extend generally along the wall in preselected spaced apart relations with reference surface 25, as discussed in detail hereafter and as best seen in FIG. 3. Extendable molding unit 21 may be formed or molded from a desired resin material, such as a plastic or the like for instance having the required strength and dielectric characteristics, and the extendable molding unit is provided with a generally elongate conduit 55 in which conductor 22 is in part contained. The conduit has an elongate base wall 57 integrally interposed between a pair of elongate sidewalls 59, 61. Base wall 57 defines with opposite sidewalls 59, 61 a pair of opposite retaining grooves 63, 65 with the opposite sidewalls respectively terminating in a guide ledge or edge 67, and another groove or land 69 is provided in the base wall intermediate the retaining grooves. A cover wall 71 is spaced apart from base wall 57 and integrally formed between opposite sidewalls 59, 61 thereof to create at least in part a chamber 73 in which is contained conductor 22. Albeit not shown in FIG. 3 for purposes of drawing simplicity and brevity of disclosure, it may be noted that grooves 63, 65, 69 in base wall 57 extend lengthwise across conduit 55.

To effect the mounting engagement of extendable molding unit 21 with mounting device 27 secured in its predetermined position on wall 23, conduit 55 of the extendable molding unit may be manually located to laterally align the open ends of retaining grooves 63, 65 with flanges 39, 41 of the mounting device. Thereafter, the conduit 55 may be laterally moved to slidable receive gripping ledges 43 on mounting flanges 39, 41 within retaining grooves 63, 65, in base wall 57. When gripping ledges 43 are so slidable received within retaining grooves 63, 65, it may be noted that extendable molding unit 21 is generally laterally relatively movable along wall 23 with respect to mounting device 27, and it may also be noted that the gripping edges are arranged in association with guide ledges 67 on conduit opposite sidewalls 59, 61 thereby to obviate undesired displacement of molding unit 21 from the mounting device in a rightward direction as viewed in FIG. 3. To complete the above desired method of assembling extendable molding unit 21 with mounting device 27, it may be further noted that opposite sidewall 61 on the molding unit is predeterminedly spaced apart from reference surface 25.

Figure 6:
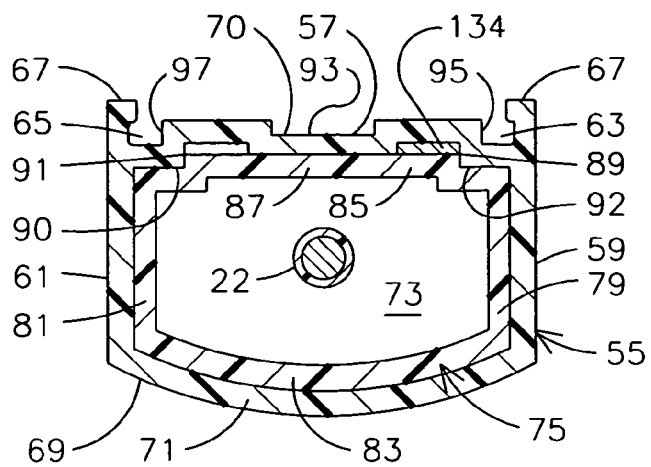
FIG. 6 is a sectional view taken along section line 6—6 in FIG. 5.

With reference in general to the drawings and recapitulating at least in part with respect to the foregoing, extendable molding unit 21 in one form of the invention is provided a pair of telescopically arranged elongate conduits or conduit members 55, 75 (FIGS. 4 and 5) extendable or movable with respect to each other and defining therein expandable chamber 73 (FIGS. 5 and 6). Conductor 22 is disposed in and extends across chamber 73 and interconnected between opposed ends of conduits 55, 75. The conductor includes a section 77 arranged to accommodate a change in length of the chamber 73 resulting from the relative extension of the conduits (FIG. 5). The terms "expandable" and "extension" are used herein in shortcut form to refer to both an increase in dimension (expansion) and the reciprocal decrease in dimension (contraction), and repetitions thereof.

More particularly and with specific reference to FIGS. 4–6, conduit 75 may be formed of any known material, for example a resin material such as a plastic or the like having the desired strength and dielectric characteristics, as mentioned above with respect to conduit 55. Conduit 75 is shaped or otherwise configured to be at least in part reciprocally received in conduit 55, and best seen in FIG. 6. Conduit 75 has a pair of opposite sidewalls 79, 81, slidably arranged with opposite sidewalls 59, 61 of conduit 55. A cover wall 83 on conduit 75 is integrally interposed between opposite sidewalls 79, 81 thereof, and cover wall 83 is slidably arranged with cover wall 69 on conduit 55. Conduit 75 is also provided with a base wall 85 spaced opposite cover wall 83 and integrally interposed between opposite sidewalls 79, 81. Base wall 85 is slidably arranged with base wall 57 on conduit 55. Base wall 85 on conduit 75 is provided with a land 87 having opposite edges 89, 91, and the land 87 is slidably arranged with a wall on intermediate groove or land 70 of base wall 57 on conduit 55 while the opposite edges of the land are slidably and guideably contained between opposed sidewalls respectively 95, 97 of grooves 63, 65 in base wall 57 on conduit 55. A pair of opposite ledges 90, 92 is also provided on base wall 85 being interposed between opposite side edges of land 87 and opposite sidewalls 79, 81 of conduit 75 respectively. In the light of the foregoing, it may be noted that conduit 55, 75 are configured to be slidably arranged with each other thereby to provide the telescopic association or arrangement and the extendable movement of the conduits between their respective retracted and extended positions. A seal 100 may be disposed between conduit members 55, 75 to restrict the ingress of water or other fluid between the conduit members and into chamber 73. Seal 100 is illustrated as a flexible member such as a rubber gasket attached to conduit 55 and making sliding/sealing contact with conduit 75, although other configurations and locations may be used for various applications. Such a seal 100 may also function to keep a fluid within the conduit members 55, 75 for conveying the fluid through the molding unit.

Figure 7:
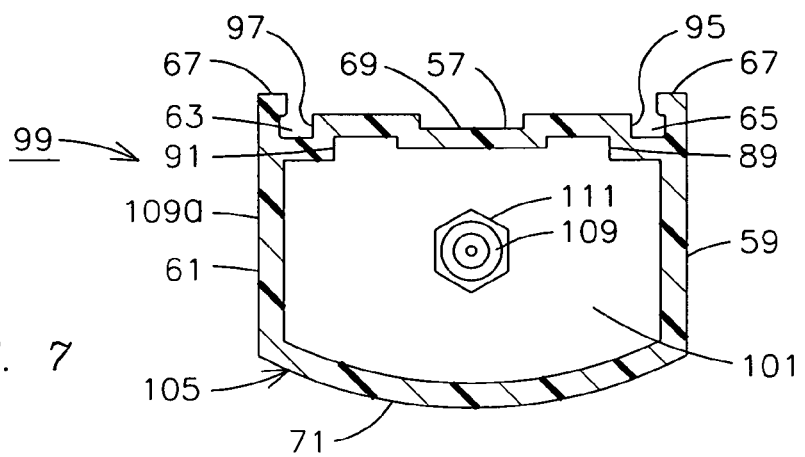
FIG. 7 is an end view of the extendable channel unit taken along line 7—7 in FIG. 5.
Figure 10:
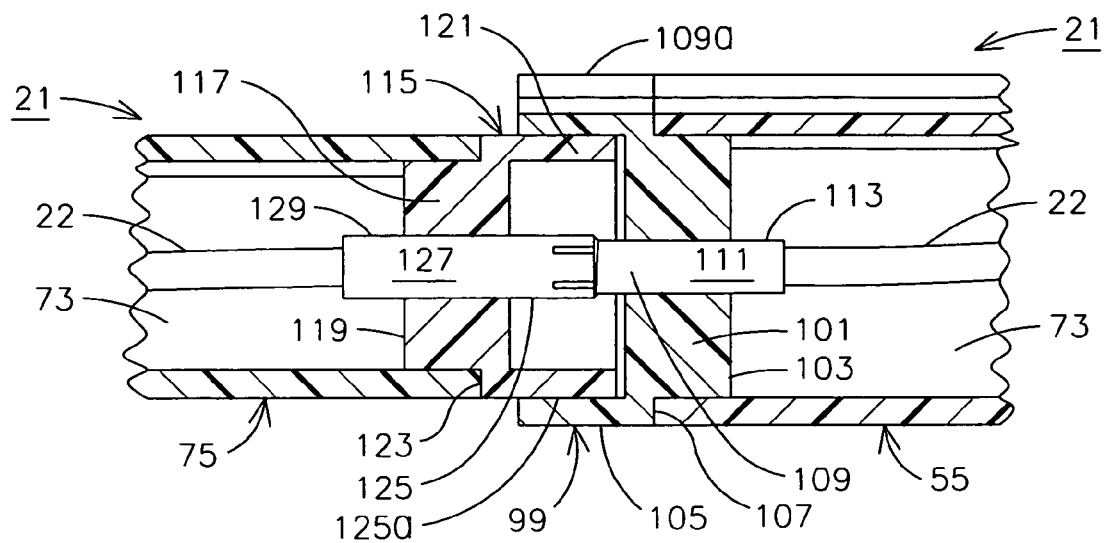
FIG. 10 is a partial view illustrating the conductive interconnection of an adjacent pair of the extendable channel units arranged in end-to-end relation in cross-section.

Referring now to FIGS. 5 and 7, a closure member 99 for conduit 55 includes a wall or plug 101 with an inner end or end portion 103 seated in the leftward end of the conduit against displacement there from as seen in FIGS. 5, 7 and 10, and if desired inner end portion 103 may be fixedly secured within the leftward end of the conduit by suitable adhesive means, such as by gluing or the like for instance. A sheath or shroud 105 integral with closure wall 101 extends generally opposite inner end portion 103 exteriorly of conduit 55, and an abutment or shoulder 107 on wall 101 extends between the inner end portion thereof and the sheath or sheathing. Shoulder 107 is seated or otherwise abutted against the leftward end of conduit 55, and the sheathing extends in protective relation about an exterior connector or female connector 109 provided on a terminal 111 mounted in wall 101 of closure member 99 so as to extend there through into chamber 73. It may be noted that sheathing 105 is provided with a configuration complimenting that of conduit 55 wherein an outer peripheral surface 109a of the sheathing defines extensions of the above described walls of conduit 55 as may be seen in FIGS. 4, 5, and 7. To complete the description of closure member 99, terminal 111 has an interior end 113 disposed within chamber 73, and the interior end 113 of the terminal is conductively interconnected with one end of conductor 22.

Figure 8:
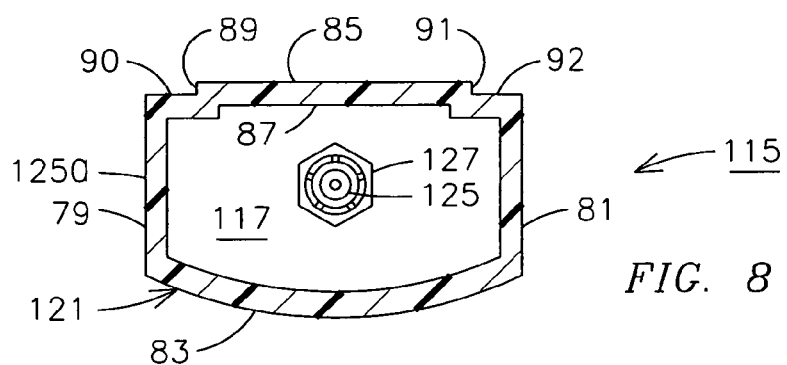
FIG. 8 is an end view of the extendable channel unit taken along line 8—8 in FIG. 5.

Conduit 75 is also provided with a closure member 115 which includes a wall or plug 117 having an inner end or end portion 119 seated in the rightward end of the conduit against displacement therefrom, as seen in FIGS. 5 and 8, and if desired the inner end portion 119 may be fixedly secured within the rightward end of the conduit by suitable adhesive means, such as an adhesive, set screw, or the like. Sheath or shroud 121 integral with wall 117 extends therefrom generally opposite inner end portion 119 exteriorly of conduit 75, and an abutment or shoulder 123 on wall 117 extends between inner end portion thereof and sheath or sheathing 121. Shoulder 123 is seated or otherwise abutted against the rightward end of conduit 75 and extends in protective relation about an exterior connector or male connector end 125 provided on a terminal 127 mounted in wall 117 of closure member 115. It may be noted that sheathing 121 is provided with a peripheral configuration complementary to that of conduit 75. Furthermore, it may also be noted that the peripheral configurations of sheathing 105, 121 on closure members 99, 115 are predetermined so as to be able to interfit with each other, as further discussed hereinafter. Terminal 127 has an interior end 129 disposed within chamber 73, and the terminal interior end is conductively interconnected with the other opposite end of conductor 22.

With the opposite ends of conductor 22 conductively interconnected with interior ends 113, 129 of terminals 111, 127, it may be noted that a generally central or intermediate section 131 of conductors 22 may be arranged in a generally sinuous configuration, as indicated generally at 133 and at best seen in FIG. 5. Thus, in response to manual relative movement of conduits 55, 75 from their retracted positions, as seen in FIG. 4, into their extended positions, as seen in FIG. 5, it may be noted that the sinuous configuration 133 at the generally central sections 131 of conductor 22 is conjointly moveable with the conduits so as to extend the effective length of the conductor and accommodate the extension of the conduits into their extended position.

While conductor 22 as illustrated herein as a coaxial cable, it is contemplated that extendable molding unit 21 may be provided with various different types of conductors within the scope of the invention, such various different types of conductors including, but not limited to, a signal transmitting conductor, a power transmitting conductor, a fluid transmitting conductor such as a tube, a telephone cable, a fiber optic cable, or a ribbon cable, a printed circuit board either active or not active, and combinations thereof, for instance. Appropriate shielding may be provided within the device to isolate conductors susceptible to interference. Of course, different types of conduits or cable respectively require different types of terminals; therefore, while male and female terminals 111, 127 are shown in the extendable molding unit, various different types of terminals required to terminate the aforementioned various types of conductors may be utilized within the scope of the present invention. Furthermore, it is anticipated that extendable molding units 21 may be provided in various lengths and be interconnected so as be utilized in rooms of various different sizes. Various exterior shapes, materials, colors and textures may also be provided for decorative purposes.

As seen in FIG. 4, conduit 75 is provided with an abutment or retainer 132 secured by suitable means, such as an adhesive or integrally formed or the like for instance, to land 87 on base wall 85 of the conduit with the abutment 132 being spaced adjacent opposite side edge 91 of land 87. The abutment is shown in dotted lines in FIG. 4 being predeterminedly spaced apart from the end of conduit 55 when conduits 55, 75 are in the retracted position thereof. Thus, it may be noted that abutment 132 on conduit 75 is movably or slidably received within a groove in base wall 57 of conduit 55. Further, another abutment or retainer 134 is provided within the groove being secured by suitable means, such as an adhesive or the like for instance, to base wall 57 of conduit 55 so as to extend into abutting engagement with abutment 132 of conduit 75. Albeit not shown for purposes of drawings simplification and brevity of disclosure, it may be noted that abutment 132 on conduit 75 is movable toward abutting engagement with abutment 134 of conduit 55 upon the relative movement of conduits 55, 75 from the retracted position thereof, as seen in FIG. 4, toward the extended position thereof, as seen in FIG. 5. To complete the description of extendable molding unit 21, it may be noted that the above-discussed engagement of abutment 132, 134 not only retains conduit 75 against displacement from conduit 55 but also defines the most extended position of the conduits. Thus, during assembly of extendable molding unit 21, conduit 75 is preferably slid into conduit 55 from the location of closure end 99 (left to right in FIG. 4) before closure end 99 is installed. Alternatively, retainer 132 may be formed to have one tapered surface and a degree of compressibility, such as being formed of an elastomer or being spring-actuated, so that it can be moved past retainer 134 in one direction to insert conduit 75 into conduit 55, and also to restrict its movement past retainer 134 in the opposed direction to function as a stop defining the extended position of unit 21.

Figure 9:
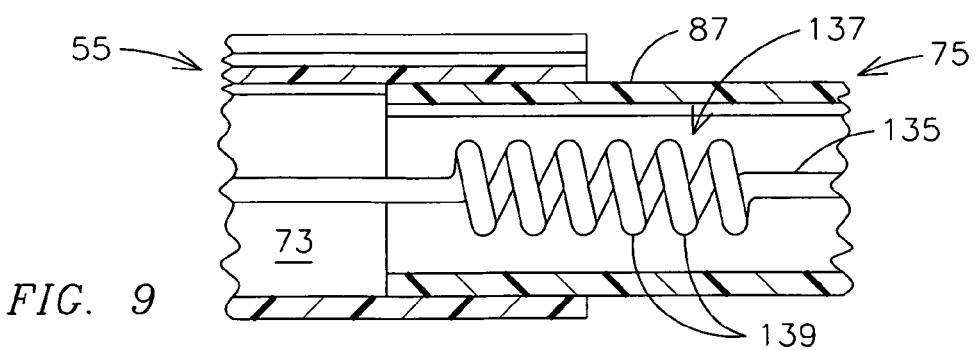
FIG. 9 is a partial view taken from FIG. 5 and illustrating an alternative conductor having expansible coils therein which is adapted for use in the extendable channel unit.

As illustrated in FIG. 9, an alternative conductor 135 having an intermediate section 137 with a plurality of expansible or extendable coils 139 therein is provided in expansible chamber 73 between conduits 55, 75; however, for the purposes of drawing simplifications, the conductive interconnection of conductor 135 with terminals 111, 127 of conduit 55, 75 is omitted. However, it may be noted that the respective manual movements of conduit 55, 75 from their retracted position to their extended position would effect the conjoint extension of extendable coils 139 in conductor 135 to accommodate the extension of conduits 55, 75 into the extended position thereof within the scope of the present invention. The spring constant of the extendable coils 139 may be selected to be sufficiently high to ensure that the length of conductor 135 is retracted to a desired shorter length upon the movement of unit 21 to its retracted length, as shown in FIG. 4, and also to be sufficiently low so that an undesired amount of spring-back of the unit 21 is not encountered when handling the unit 21 during installation.

Figure 11:
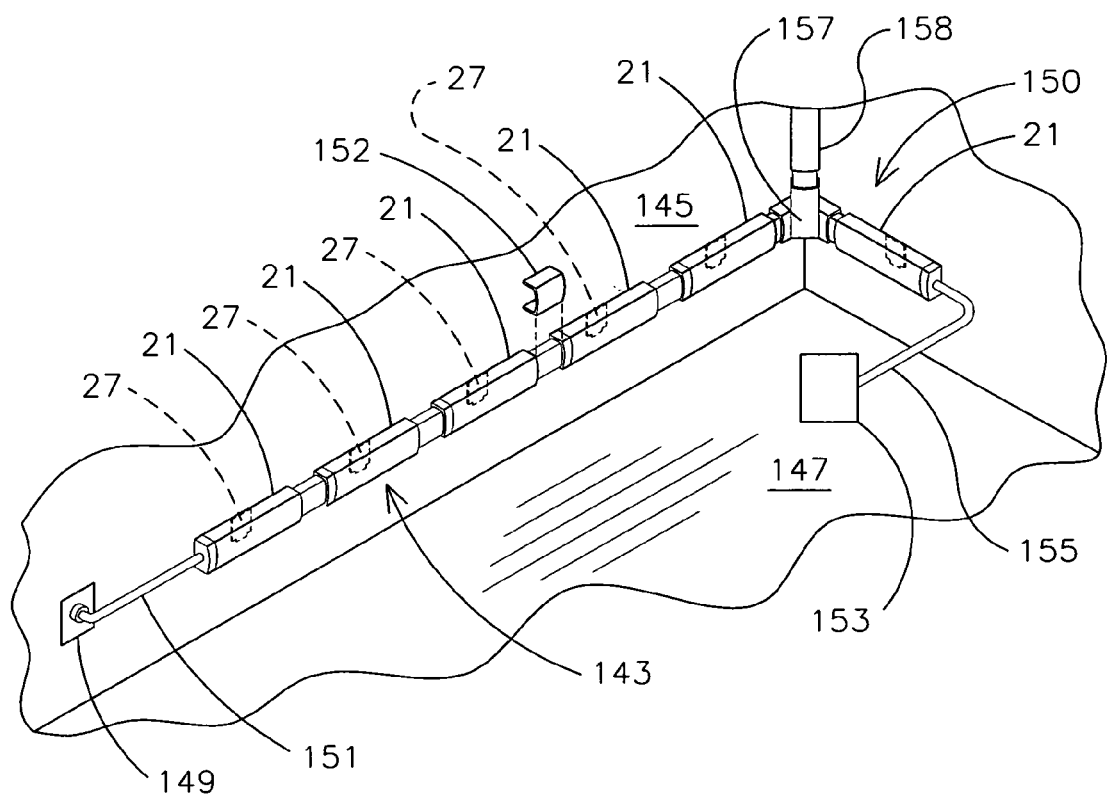
FIG. 11 is a schematic diagram of a wiring system for a room with the wiring systems having a plurality of the extendable channel units arranged in end-to-end relation therein.

With reference again in general to the drawing and recapitulating at least in part with respect to the foregoing, there is illustrated in one form of the invention a method of assembling a plurality of extendable molding units 21 to define a wiring system 143 along at least one surface 145 of a room 147 (FIGS. 10 and 11). Each extendable molding unit 21 includes a pair of relatively extendable conduits members 55, 75 telescopically arranged with respect to each other and each having a closed end or closure member 99, 115 with a conductor conductively connected between the closed ends, and an extendable section 133 in the conductor (FIGS. 4–6). Conduit pairs 55, 57 are arranged in end-to-end relation along surface 145 of room 147 (FIG. 11) and at least some of the conduit pairs are extended generally end-wise thereof upon their arrangement in the end-to-end relation thereof (FIGS. 4 and 5). Extension of conductor section 77 of the at least some conduit pairs 55, 75 is effected when the conduit pairs are extended generally end-wise thereof (FIG. 5), and conductors 22 of the conduit pairs of each extendable molding unit are interconnected in continuous conductive relation with each other.

More particularly and with specific reference to FIG. 10, there is shown a plurality of extendable molding units 21 arranged in end-to-end relation with each other to interconnect female and male terminals 111, 127 in conduits 55, 75 in conductive relation. As previously mentioned, outer peripheral surface 105a of sheathing 105 on closure member 99 is predeterminately configured to define an extension of the outer periphery of conduit 55. Inner peripheral surface 141 provided on sheathing 105 is predeterminately configured to form a slideway and slidably receive outer peripheral surface 125a of sheathing 121 on closure member 115 of conduit 95, which in turn is predeterminedly configured to form a slide to be received in said slideway when a pair of extendable molding units 21 are arranged in end-to-end relation with each other.

In the practice of the above mentioned assembly method, a plurality of extendendable molding units 21 are arranged or otherwise disposed in end-to-end relation along the at least one surface 145, and at least some of the conduit pairs 55, 75 are extended generally end-wise into their extended positions upon the arrangement of extendable molding units 21 into the end-to-end relation thereof; as seen in FIG. 10. Further is also seen in FIG. 10, extendable molding units 21 arranged in the end-to-end relation thereof are illustrated in box form for the purpose of drawing simplification and brevity of disclosure.

To accommodate the end-to-end arrangement of extendable molding units 21 along surface 145 of room 147, conduit 55 of each extendable molding unit is secured or otherwise disposed in a preselected position on the surface. In order to effect the aforementioned securing of conduit 55 to surface 145, mounting devices 27, as discussed in detail above and as seen in FIGS. 1–3, may be positioned or otherwise mounted in pre-selected positions along surface 145, and conduit 55 of each extendable molding device 21 is mounted to the mounting devices, as seen in FIG. 3. For the purpose of drawing simplification, mounting devices 27 are diagrammatically shown as boxes in dotted outline in FIG. 11. To effect the aforementioned releasable mounting of conduit 55 of each extendable molding unit 21, such conduits 55, 75 are respectively received in sliding relation on mounting devices 27 which accommodates the aforementioned extension of conduits 55, 75 of each extendable molding unit 21 arranged in the end-to-end relation thereof. In other embodiments, the conduits may be configured to snap onto the mounting devices, then to slide laterally into a desired position. It may be noted that upon aforementioned extension of conduit pairs 55, 75 of at least some of the extendable molding units 21 arranged in the end-to-end relation thereof, female and male connectors 109, 125 on terminals 111, 127 in adjacent ones of conduit pairs 55, 75 are interconnected in conductive relation as the conduit pairs are arranged in their end-to-end relation generally concurrently with the above discussed end-to-end arrangement of extendable molding units, as seen in FIG. 10. While mounting devices 27 are utilized in conjunction with conduits 55 of extendable molding units 21 as set out in the discussion relating this method of assembling the extendable molding units in end-to-end relation, it is contemplated that various other mounting devices and/or attachment points on the molding units 21 may be utilized with the extendable molding units within the scope of the invention.

When conduits 55, 75 of extendable molding units 21 are extended, i.e. manually moved from the retracted position to the extended position thereof, as previously discussed and as seen in FIGS. 4 and 5, it may be noted that the sinuous arrangement 133 in section 131 of conductor 22 is conjointly movable with the conduits thereby to extend the effective length of conductor 22 which serves to accommodate the extensions of conduits 55, 75 in respective ones of extendable molding units 21 in their end-to-end relation. Furthermore, when extendable molding units 21 are associated in the end-to-end relation thereof, it may be noted that conduits 55, 75 in adjacent ones of the extendable molding units 21 are interconnected with each other which effects the interconnection of conductors 22 in each of the extendable molding units in a continuous conductive relation with each other. As seen in FIG. 11, a signal or power outlet 149 for wiring system 143 is provided on wall 145 of room 147, and a jumper conductor or cable 151 is interconnected in conductive relation between outlet 149 and extendable molding units 21 in the end-to-end relation thereof on wall 145. A power or signal operated unit or device 153 is schematically illustrated in box form in room 147, and to complete the description of this assembly method, another jumper conduit or cable 155 for wiring system 143 is interconnected in conductive relation between device 151 and extendable molding units 21. In this manner, the device of the present invention may be used to provide connectivity for Internet, cable TV, phone, video, games, computers and peripherals, IP addressable devices, high-speed data transmission, etc., to satisfy the increasing demand for such signals into existing spaces and into buildings under renovation or construction. A decorative cover 152 having an exterior shape configured to match the exterior shape of conduit 55 may be installed over the exposed portions of conduit 75 in order to provide an aesthetically more pleasing appearance to the assembly. Corner pieces may be provided to interconnect units 21 mounted on intersecting surfaces; i.e. a ninety degree bend piece 157 to fit around corner 150 of FIG. 11. Piece 157 includes three legs for interconnecting two horizontal runs 21 and one vertical run 158 of extendable molding units. Furthermore, corner units may be configured to fit into an inside corner (as shown) or around an outside corner. Vertical run molding unit 158 is illustrated as being disposed along a corner of two walls 145 of a room. While the geometry for such a location may be different than the embodiment of horizontal run molding unit 21, one skilled in the art may appreciate that the aspects of mounting, interconnection, extendibility, etc. described above likewise may be advantageously applied to this embodiment.

Figure 12:
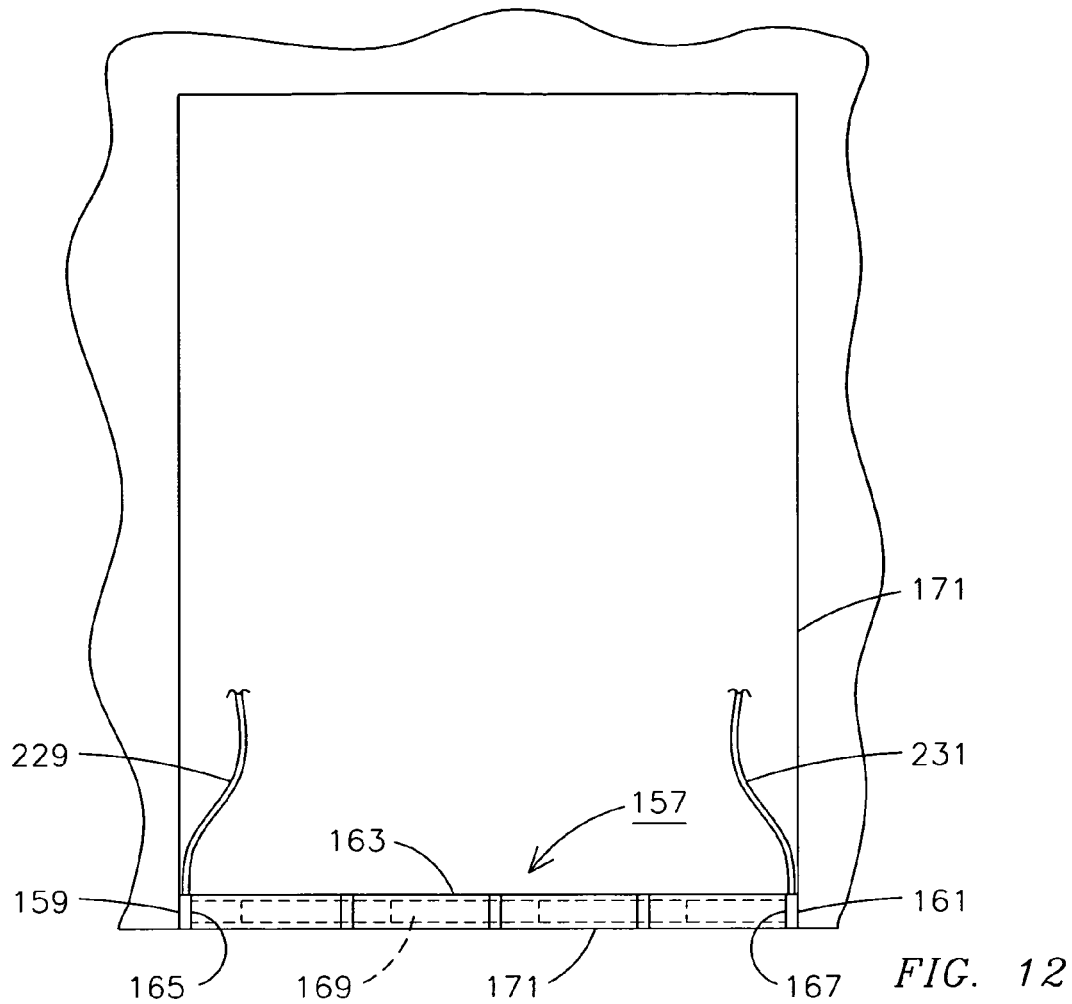
FIG. 12 is an elevation view illustrating an extendable ramp device disposed along a floor in a doorway with a plurality of the extendable channel units arranged in end-to-end relation within an elongate ramp having opposite end caps and utilized to span a part of a wiring system across the doorway.
Figure 13:
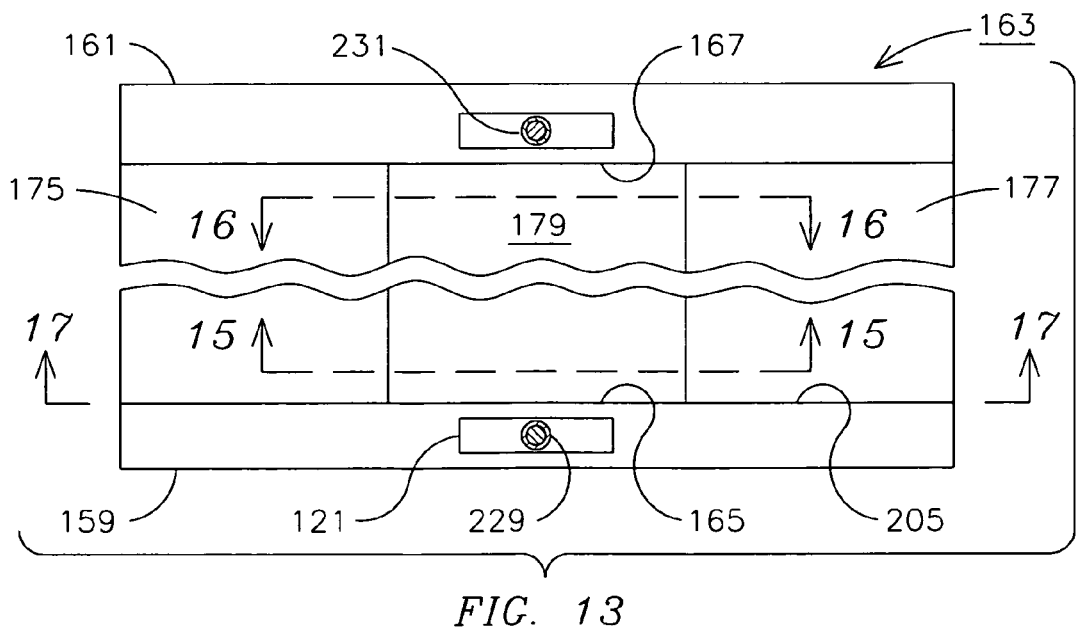
FIG. 13 is a partial plan view illustrating the end caps secured to the ramp.

One skilled in the art may appreciate that the present device and method may be used to extend a conductor along any wall, floor or ceiling of a room, around windows and doors, along corners, etc. The architectural style of the exterior portions of the device may be selected to be aesthetically pleasing for each of these arrangements. However, when extending a conductor across a floor, one must consider not only aesthetics but also safety and convenience. In particular, the conduits must not pose a tripping danger, they must not prevent movement by a person in a wheel chair or other mobility device, and they must provide mechanical protection for the conductor against the weight of a person or mobility device. Accordingly, in one form of the invention there is illustrated in FIG. 12 an extendable ramp device 157 including a pair of ramp or closure end caps 159, 161, a generally elongate ramp 163 having a pair of opposite ends 165, 167 and a plurality of extendable molding units 21 to define a part of a wiring system 169 along a floor such as across a doorway 171 (FIG. 12). The ramp device 157 may be designed to be compliant with the American with Disabilities Act (ADA). Extendable molding units 21 respectively include a pair of extendable conduits 55, 75 telescopically arranged for relative movement and each having a closed end defined by closure, members 99, 115 with a conductor 22 conductively connected between the closed ends, and the conductor having an extendable section 131 (FIGS. 4–6 and 10). In the practice of this method, conduit pairs 55, 75 of each extendable molding unit 21 are extended, and extendable section 133 of conductor 22 conductively connected between closure members 99, 115 of each conduit pair 55, 75 is extended upon the occurrence of the extensions of the conduit pairs of each extendable molding unit, (FIG. 4). Extended conduit pairs 55, 75 of each extendable molding unit 21 is arranged or otherwise received in end-to-end relations within elongate ramp 163, and end caps 159, 161 are secured to opposite ends 165, 167 of the elongate ramp against displacement therefrom, respectively, when the extended conduit pairs of each extendable molding unit is arranged within the elongate ramp. Upon the securement of end caps 159, 161 to elongate ramp 163, the end caps are engaged or otherwise abutted with respective ones of the extended conduit pairs 55, 75 in the elongate ramps and adjacent to the end caps, as described in detail hereinafter.

Figure 15:
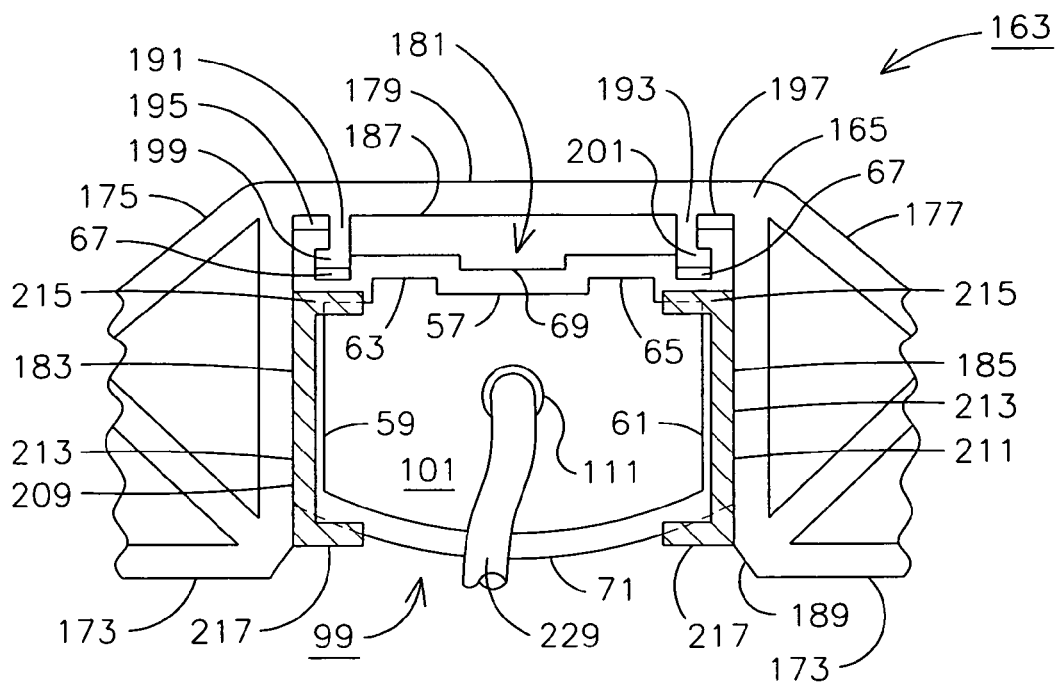
FIG. 15 is a sectional view taken along line 15—15 in FIG. 13.
Figure 16:
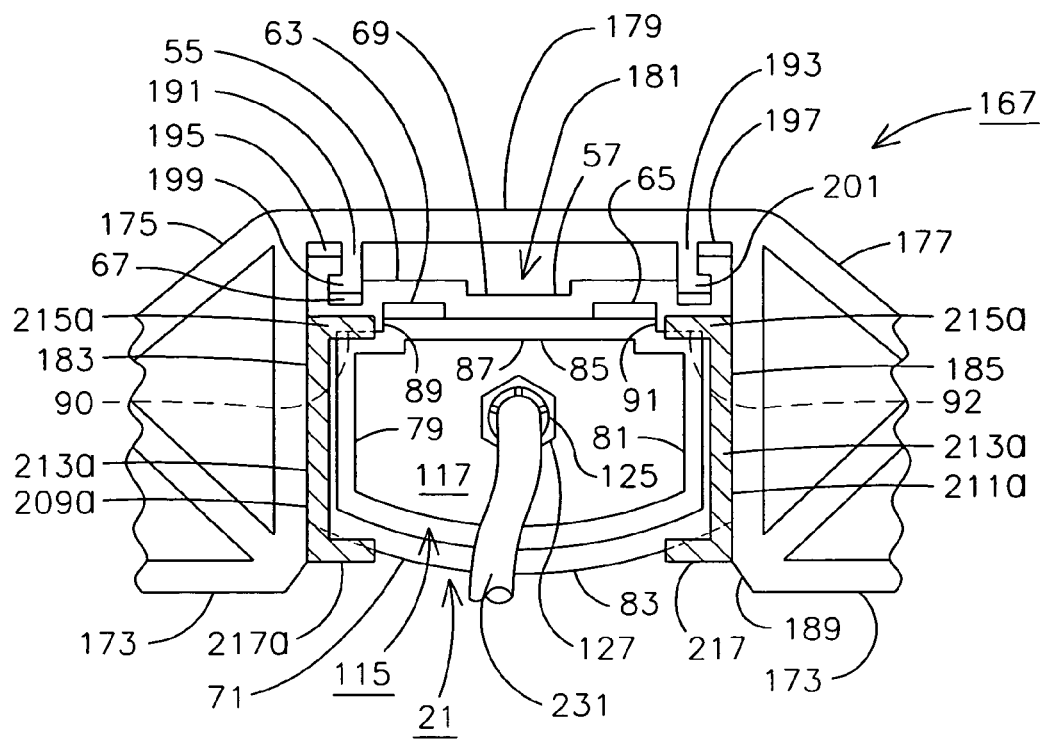
FIG. 16 is a sectional view taken along line 16—16 in FIG. 13 when the other end of the end caps is secured to the other opposite end of the ramp.

Elongate ramp 163 may be formed of a suitable resin material, such as a plastic or the like for instance, with slidably interlocking sections molded or cut to any desired length and slidably overlapped to a desired degree to achieve a desired length for the ramp 163. Elongate ramp 163 includes a base 173, a pair of opposed ramp sections 175, 177 engaged with the base, a central section 179 spaced above the base and interposed between the opposed ramp sections, and channel 181 bisects the base and is defined between the central section and the opposed ramp sections, as seen in FIGS. 15 and 16. Furthermore, each of base 173, opposed ramp sections 175, 177, central sections 179 and channel 181 extend between opposite ends 165, 167 of elongate ramp. Opposed ramp sections 175, 177 respectively, provide a pair of opposite sidewalls 183, 185 for channel 181, and central section 179 provides a base wall 187 for the channel interposed between the opposite sidewalls thereof. As previously mentioned, channel 181 bisects base walls 173 of elongate ramp 163; therefore, the channel is provided with an open end 189 between opposite sidewalls 183, 185 and spaced opposite base wall 187. A pair of retaining flanges 191, 193 are integrally formed with base wall 187 of channel 181 extending thereinto adjacent opposite sidewalls 183, 185 and connecting with opposite ends 165, 167 of elongate ramp 163 thereby to form a pair of opposed mounting grooves 195, 197 between opposite ends 164, 167 of the elongate ramp, and the retaining flanges respectively terminate in guide ledges 199, 201 extending into mounting grooves 195, 197.

Extendable molding units 21 are arranged in end-to-end relation in elongate ramp 163, and in such end-to-end relation, opposite sidewalls 59, 61 of conduit 55 are slidably and guideably engaged with opposite sidewalls 183, 185 of channel 181. Further, guide ledges 67 of opposite sidewalls 59, 61 on conduit 55 extend into opposite grooves 195, 197 in elongate ramp 163 with guide ledges 67 slidably and guideably engaged with guide ledges 199, 201 and it may be noted that the engagements between guide ledges 67, 199, 201 retain conduit 55 against displacement from elongate ramp 163 through open end 189 of channel 181. Thus, as each extendable molding unit 21 is received in the aforementioned end-to-end relation thereof in channel 181 of elongate ramp 163, conduit 55 thereof is slidably arranged with the elongate ramp within channel 181 against displacement through open end 189 thereof. It may be noted that each extendable molding unit 21 has its conduits 55, 75 in the extended position thereof upon the reception of each extendable molding unit 21 in channel 181 of elongate ramp 163, and it may be further noted that adjacent ones of such extendable molding units are conductively interconnected, as illustrated in FIG. 10 and as discussed in detail hereinbefore.

Figure 14:
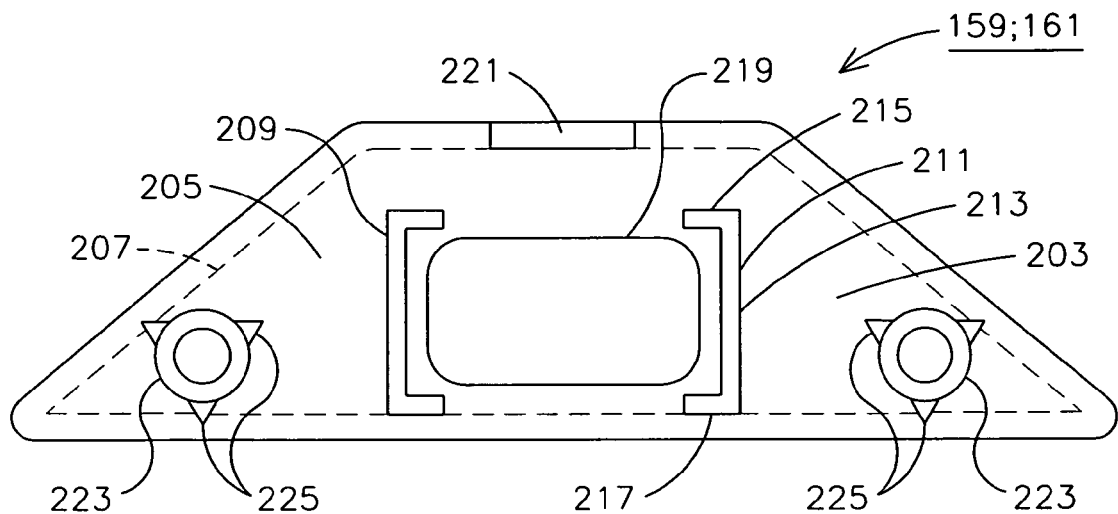
FIG. 14 is a side elevational view of the one end cap showing a face thereof for mounting against the ramp.

Since end caps 159, 161 are of like construction each having the same component parts, the ends cap shown in FIG. 14 is indicated by both reference numbers 159, 161 but only end cap 159 is described hereafter; however, the like components of the end cap 161 are indicated by the addition of a sub-reference numeral "a", and it may be noted the end caps each have a peripheral configuration complementary to that of elongate ramp 163.

End cap 159 is provided with a body 203 having a closures face 205 with a peripheral configuration complementary to opposite end 165 of elongate ramp 163, and a peripheral flange 207 is integrally formed with the body so as to extend in a direction away from the closure face. Body 203 is provided with a pair of integral formed, spaced apart, opposed generally C-shaped extensions or abutments 209, 211 which extend beyond closure face 205 generally perpendicular thereto, respectively, and each C-shaped extension includes a sidewall 213 interposed between a pair of spaced apart end flanges 215, 217 which extend generally perpendicular from the sidewall. An opening 219 extends through body 203 intermediate sidewalls 213 of C-shaped extensions 209, 211, respectively, so as to intersect with closure face 205, and a notch 221 is provided through peripheral flange 207 generally above opening 219 through the body. To complete the description of end cap 159 a pair of interference fit cylindrical protrusions 223 are integrally formed with body 203 being spaced from sidewalls 213 of opposed C-shaped extensions 209, 211, respectively, so as to extend beyond closure face 205, and a plurality of barbs 225 are peripherally spaced about each cylindrical protrusion extending lengthwise thereof and intersecting with the closure face.

Figure 17:
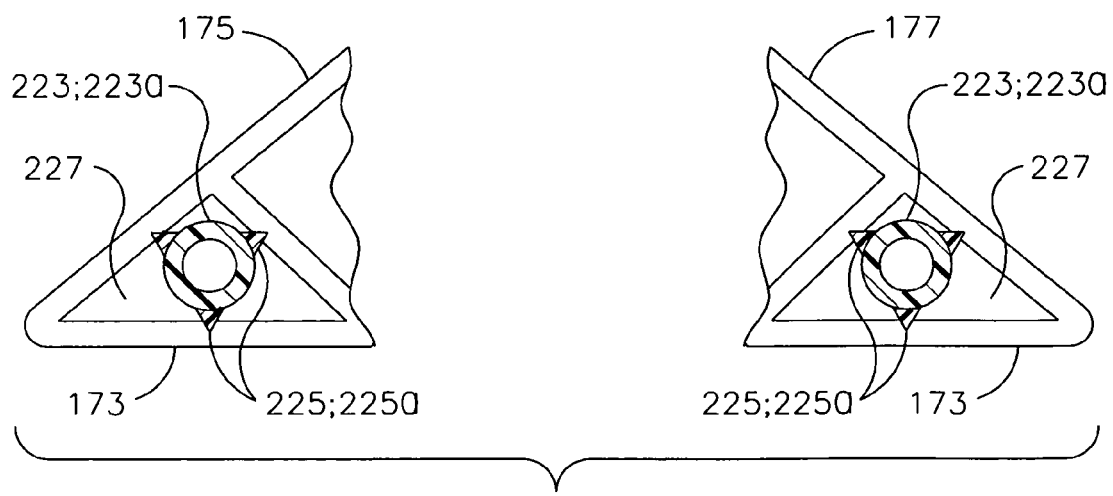
FIG. 17 is an enlarged sectional view taken along line 17—17 in FIG. 13 and partially broken away for drawing simplification.

When end cap 159 is secured or mounted to elongate ramp 163, closure face 205 of end cap 159 is abutted against opposite end 165 of the elongate ramp in closing relation therewith. To retain end cap 159 against displacement from elongate ramp 163, barbs 225 on cylindric protrusion pair 223 of end cap 159 are forced into interfering fit engagement within a pair of complementary openings or apertures 227 provided therefore in ramp sections 175, 177 of the elongate ramp, as seen in FIG. 17. The apertures extend through the elongate ramp intersecting with opposite ends 165, 167 thereof, respectively. To establish the interfering fit between barbed protrusion pair 223 and aperture pair, it is necessary to exert an applied force onto body 203 of end cap 159. Other methods of attachment may be used in other embodiments.

It may be noted that opposed C-shaped extensions 209, 211 on closure face 205 of end cap 159 are entered into channel 181 upon the above discussed securement of end cap 159 to elongate ramp 163, and the sidewalls 213 of the opposed C-shaped extensions are slidably arranged with opposite sidewalls 183, 185 of channel 181 and arranged in abutting or locating engagement with the free end of closure member 99 on conduit 55 of extendable molding unit 21 disposed in the channel adjacent end cap 159. End flanges 215, 217 of opposed C-shaped extensions 209, 211 are also arranged in abutting or locating engagement with the free end of closure member 99, and in response to the abutment of the C-shaped extensions with the closure member, at least conduit 55 of extendable molding unit 21 adjacent end frame 159 is spaced or located in channel 181 farther away from opposite end 165 of ramp 163 and away from closure face 205 of end frame 159. Further, the movement, of conduit 55 in channel 181 may effect the relative movement of conduit 55 from its extended position with respect to its associated conduit 57.

Prior to the securement of end frame 159 to elongate ramp 163, jumper conduit 229 may be secured in conductive relation to exterior connector 109 of terminal 111 in closure member 99 and strung or otherwise passed through opening 219 in body 203 of end cap 159, thereby to in part be arranged exteriorly of elongate ramp 163 upon the above discussed securement of end cap 159 thereto.

When end cap 161 is secured or mounted to elongate ramp 163, closure face 205a of end cap 161 is abutted against opposite end 167 of the elongate ramp in closing relations therewith. To retain end cap 161 against displacement from elongate ramp 163, barbs 225a on cylindric protrusion pairs 222 of end cap 161 are forced into interfering fit engagement with elongate apertures 227 provided therefore in ramp sections 175, 177 of the elongate ramp, as seen in FIG. 17, and as previously mentioned. The apertures extend through the elongate ramp intersection with opposite ends 165, 167, respectively. It is also necessary to exert an applied force onto body 203a of end cap 161 to establish the interference fit between barbed protrusions 222 and apertures 227.

As seen in FIG. 16, it may be noted that opposed C-shaped extensions 209a, 211a on closure face 205a of end cap 161 are entered into channel 181 upon the above discussed securement of end cap 161 to elongate ramp 163, and the sidewalls 213a of the opposed C-shaped extensions are slidably arranged with opposite sidewalls 183, 185 of channel 181. It may be further noted that opposed upper and lower end flange 215a, 217a on opposed C-shaped extensions 209a, 211a are arranged in supporting or locating engagement with closure member 115 on conduit 75 of extendable molding unit 21 adjacent end flange 161 secured to elongate ramp 163. More particularly, opposed lower end flanges 217a on opposed C-shaped extensions 209a, 211a on closure face 205a of end cap 161 are respectively arranged in supporting or locating engagement or relation with cover wall 83 of conduit 75, and upper end flanges 215a on the opposed C-shaped flanges are respectively slidably and guidably receives in supporting or locating relation with opposite ledge 90, 92 on closure member 115, respectively. Therefore, it is believed the above discussed supporting or locating association of opposed C-shaped extensions 209a, 211a on end cap 161 with closure member 115 of conduit 75 would at least alleviate any undesired floppy movement, i.e. up and down movement as well as sidewise movement of conduit 75 with respect to its cooperating conduit 55 in the aforementioned extendable molding unit 21 adjacent end cap 161 as viewed in FIG. 16, at least when conduit 55, 75 are in the extended position thereof.

Prior to the securement of end cap 161 to elongate ramp 163, jumper conduit 231 may be secured in conductive relation to exterior connector 125 of terminal 127 in closure member 115 and strung or otherwise passed through opening 219a in body 203a of end cap 161 thereby to be in part arranged exteriorly of elongate ramp 163 upon the above discussed securement of end cap 161 thereto.

It is believed that extendable molding unit 21 may be associated in end-to-end relation mounted to a wall of a room or in ramp devices 157, as discussed above, without employing professional installers since no cutting or custom tools are required thereby resulting in lower installation costs. It is also believed that the exterior of extendable molding units 21 may be provided with various different decors, colors, materials, etc. Furthermore, it is also believed that the extendable molding units 21 arranged in end-to-end relation lend themselves to either vertical or horizontal placement along or on any surface, as well as providing simple removal from such placement.

Figure 18:
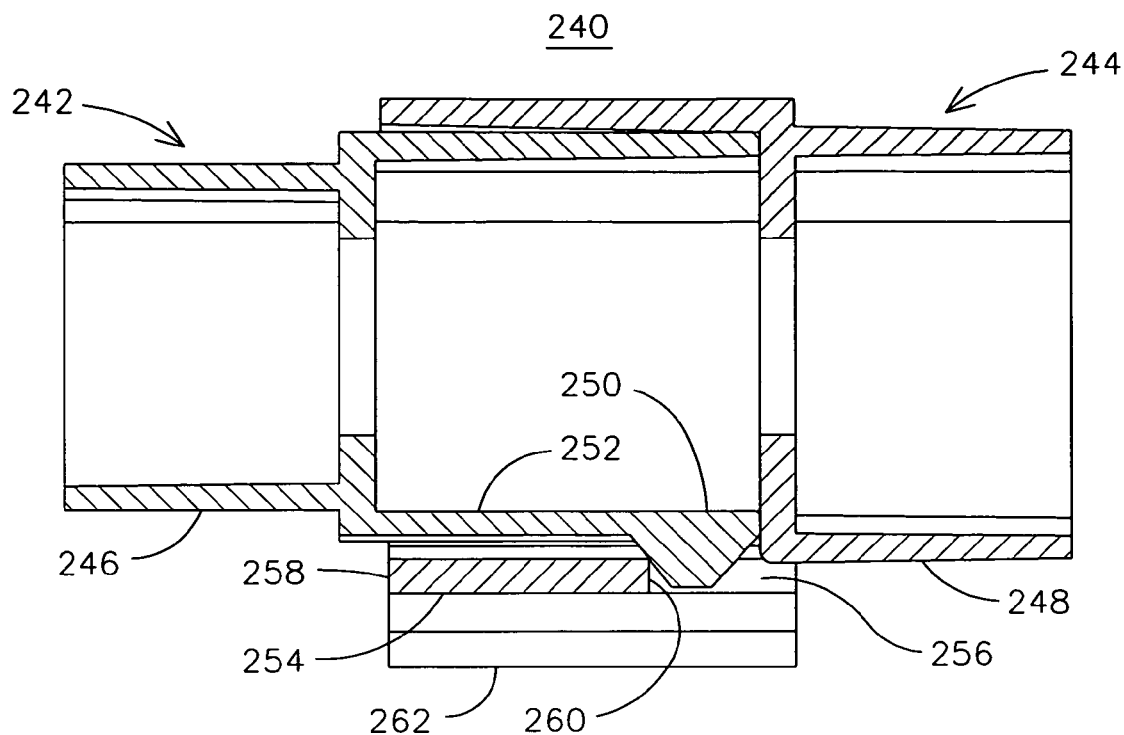
FIG. 18 is a sectional view of an end cap assembly used to join a pair of extendable channel units.

The installation and removal of molding units 21 in end-to-end relation as illustrated in FIG. 11 may be facilitated by the incorporation of the end cap assembly 240 illustrated in sectional view in FIG. 18. End cap assembly 240 includes cooperating male and female end caps 242, 244. End caps 242, 244 include respective distal ends 246, 248 configured for installation on opposed ends of conduits 75, 55 respectively of FIG. 4. End caps 242, 244 may be affixed to the opposed ends of conduits 75, 55 with an adhesive such as an epoxy or solvent or by other appropriate means. Molding units 21 are then joined in end-to-end relation by inserting male end cap 242 of one molding unit 21 partially into female end cap 244 of an adjoining molding unit 21 to form the assembly of FIG. 11. Male end cap 242 includes a protruding member 250 disposed at an end of a flexible member 252 that provides a spring bias to the protruding member 250. The spring bias allows protruding member 250 to be displaced by female end cap wall member 254 as male end cap 242 is inserted into female end cap 244, and further allows protruding member 250 to spring outwardly into an opening 256 formed in wall member 254 once the end cap assembly 240 is assembled into its fully assembled position joining adjacent molding units 21 in end-to-end relation. The protruding member 250 and opening 256 together function as a snap feature maintaining a compressive restraining force across terminals 111, 127 (shown in FIG. 5) thereby ensuring the integrity of the connection between conductors of adjoined molding units 21. The forces needed to join and to separate the male and female end caps 242, 244 may be affected by the selection of the spring bias of flexible member 252 and the angle of slope provided on protruding member 250 relative to respective edges 258, 260 of wall member 254. In one embodiment, the forces are designed to maintain a desired degree of compressive force for securing the joining of terminals 111, 127 while still permitting the end cap assembly 240 to be manually pulled apart during a disassembly process. One may appreciate that in other embodiments the male end cap may include the opening and the female end cap may include the spring biased protruding member to achieve the same snap functionality. Female cap 244 may further include opposed guide ledges 262 configured to make sliding contact with gripping ledges 43 of mounting device 27.

The extendable channel unit of the present invention may be provided without conductor 22 and terminals 111, 127 and mounted on a surface 23 to function as a raceway for the subsequent installation of conductor 22. To facilitate such later installation of conductor 22, the configuration of closure members 99, 115 may be selected to provide a relatively large opening for the passage of conductor 22 with or without terminals 111, 127.

FIG. 11 illustrates the application of the extendable channel unit of the present invention around an inside corner 150 of a room 147 using a bend piece 157. The bend piece 157 of FIG. 11 is a three-way unit including three legs for interconnecting two horizontal runs 21 and one vertical run 158 of extendable molding units. Other configurations of bend pieces may be used for outside corners and for horizontal and vertical bends that require only two legs. A selected bend piece may be joined to the extendable channel unit 21 in the manner illustrated in FIG. 10, with terminals 111, 127 interconnecting respective lengths of conductor 22 therein. One may appreciate that there is a cost associated with the design, manufacturing and inventory for the various types of bend pieces that are required to address all possible geometries. Furthermore, each terminal-to-terminal connector in a signal cable results in a loss of signal strength, e.g. typically about −3 db. Accordingly, the present invention includes an extendable channel unit 300 having an adjustable corner assembly 302 attached to an end of a main conduit member 301, as illustrated in FIGS. 19–26. This embodiment allows a single channel unit 300 to be used to run along a straight wall, to make a 90° vertically upward bend, to make a 90° vertically downward bend, to go around an inside corner, or to go around an outside corner, all without the need for any additional conductor connector. The conduit member 301 may be an extendable member, as described above with respect to extendable molding unit 21, or it may be a member having a fixed length along longitudinal axis 305.

Figure 19:
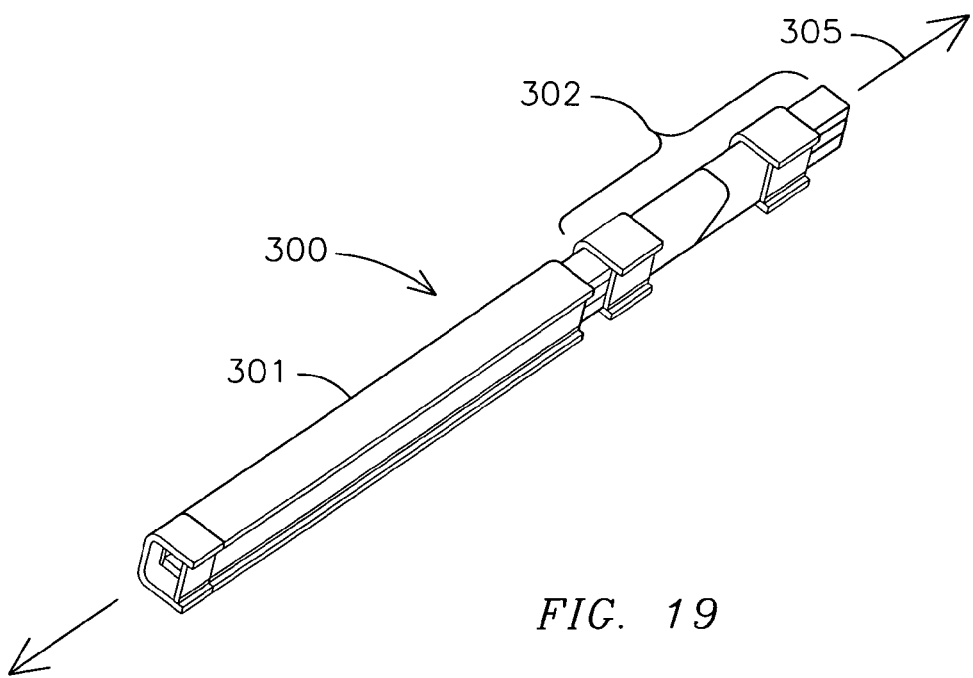
FIG. 19 is a perspective view of an extendable molding unit having an integral adjustable corner assembly in a straight configuration.
Figure 20:
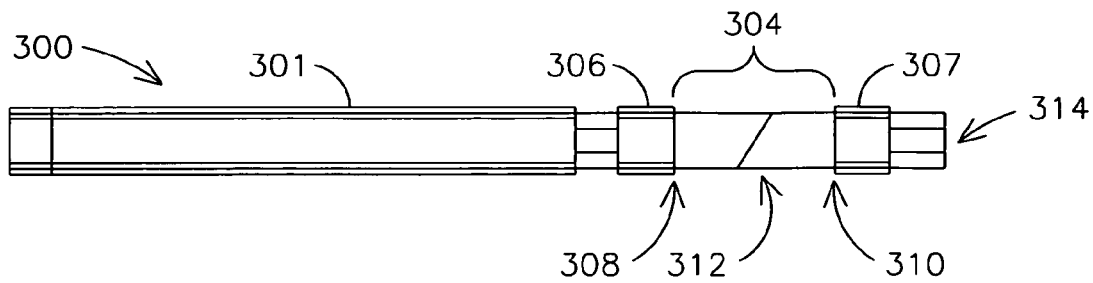
FIGS. 20–25 are respective views of the extendable molding unit of FIG. 19 in various configurations.
Figure 21:
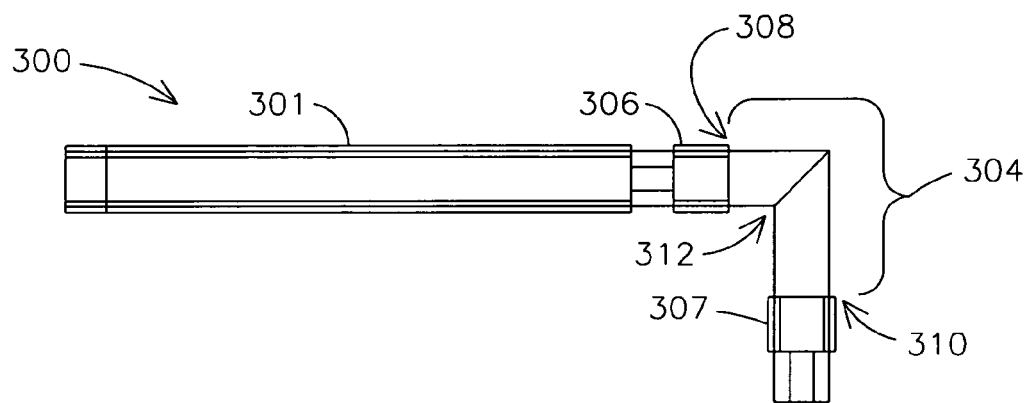
Figure 22:
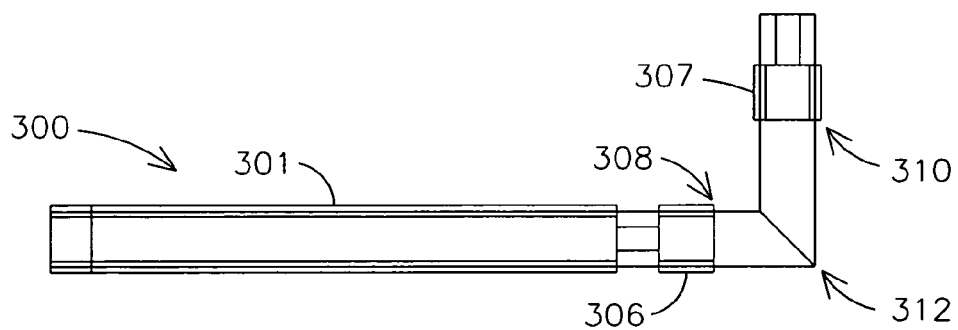

Corner assembly 302 illustrated in FIGS. 19–26 includes a center section 304 and two opposed corner couplers 306, 307. Rotatable joints 308, 310 between the center section 304 and the respective corner coupler 306, 307 allow axial rotation there between about the longitudinal axis 305, i.e the axis of a conductor (not shown in FIG. 19) passing through the conduit member 301. An angled joint 312 within the center section 304 allows rotation about an axis disposed at a 45° angle to the longitudinal axis 305. FIG. 19 is a perspective view of the extendable channel unit 300 in a straight configuration. FIG. 20 is a side view of the unit 300 in its straight configuration as viewed from the side that would be installed against a wall. FIG. 21 is also a side view of the unit 300 as viewed from the side that would be installed against a wall, but with the unit 300 configured in a right angle downward bend configuration along the wall. FIG. 22 is another side view of the unit 300 as viewed from the side that would be installed against a wall, but with the unit 300 configured in a right angle upward bend configuration along the wall.

In comparing FIGS. 20 and 21, it is noted that angled joint 312 has been rotated 180° to create the 90° bend configuration. Taken alone, the rotation of angled joint 312 by 180° would rotate the coupler 307 so that the side that should face the wall would actually be facing away from the wall. Accordingly, joint 310 is rotated 180° to properly position the coupler 307 as illustrated in FIG. 21.

In comparing FIGS. 21 and 22, it is noted that joint 308 is rotated 180° to direct the 90° bend at joint 312 to an upward direction. This movement taken alone would rotate coupler 307 so that the side that should face the wall would actually be facing away from the wall. Accordingly, joint 310 is rotated 180° to properly position the coupler 307 as illustrated in FIG. 22.

Figure 23:
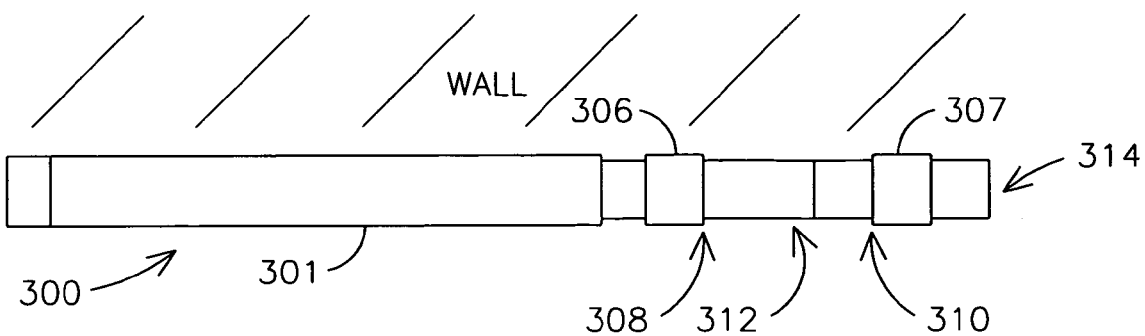
Figure 24:
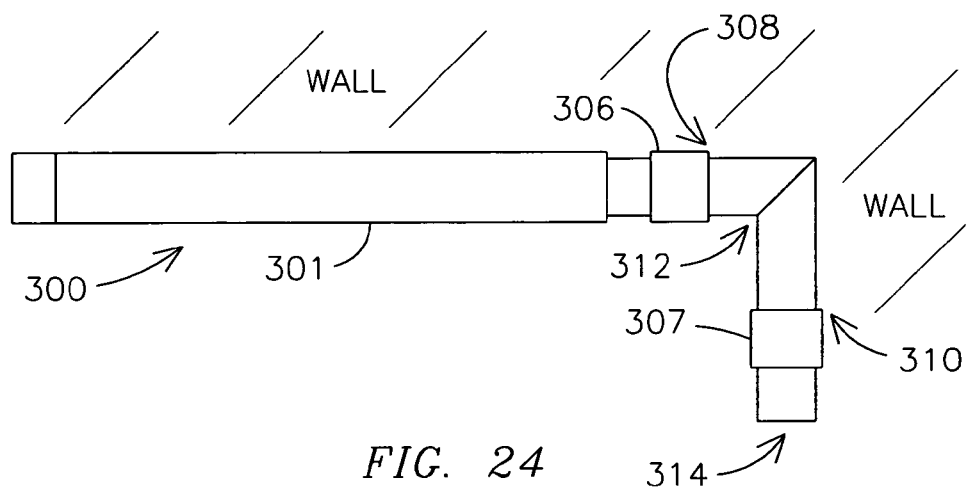
Figure 25:
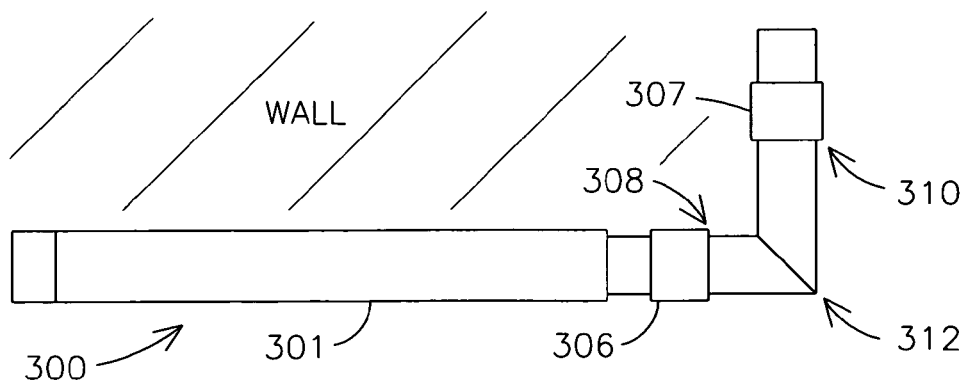

FIG. 23 is a top view of the unit 300 in its straight configuration as viewed from above as it would be installed against a straight wall. FIG. 24 is a similar top view having the unit 300 configured to extend around an inside corner. FIG. 25 is a similar top view having the unit 300 configured to extend around an outside corner.

In comparing FIGS. 23 and 24, it is noted that joint 308 has first been rotated 180°, then joint 312 has been rotated 180° to form the 90° angle. These two movements position coupler 307 in the proper orientation to extend along the wall beyond the inside corner as illustrated in FIG. 24.

In comparing FIGS. 23 and 25, it is noted that joint 312 has been rotated 180° to form the 90° angle. This movement taken alone would rotate coupler 307 so that the side that should face the wall would actually be facing away from the wall. Accordingly, joint 310 is rotated 180° to properly position the coupler 307 as illustrated in FIG. 25.

Joints 308, 310, 312 may be designed to limit the extent of available rotation such as by including appropriate mechanical stops in the joint mechanisms. This prevents the enclosed conductor from becoming twisted to an unacceptable degree by repeated rotations of any joint. In one embodiment, joints 308 and 310 are each free to rotate only 270°, and joint 312 is free to rotate only 180°.

Figure 26:
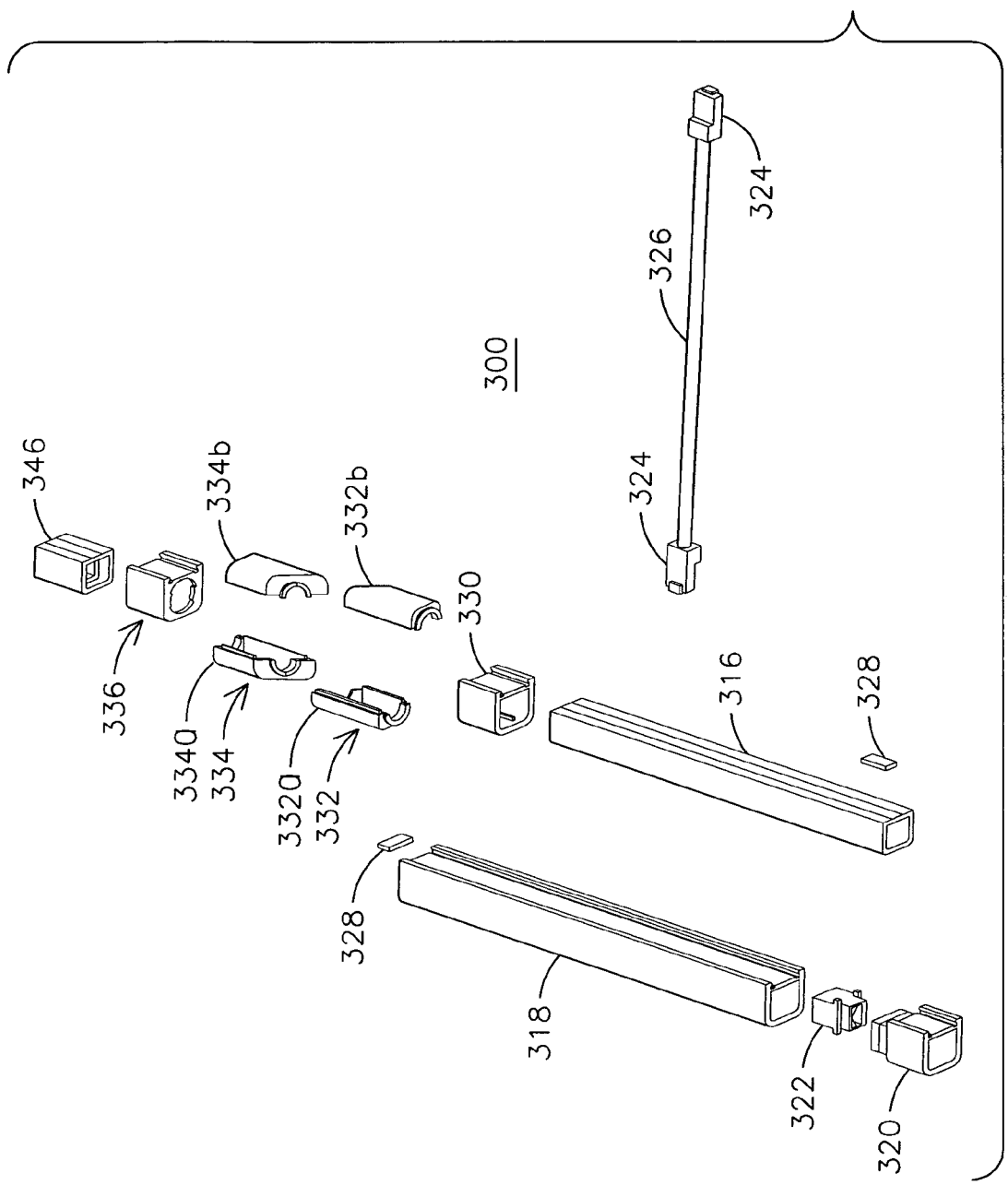
FIG. 26 is an exploded view of an extendable molding unit having an adjustable corner assembly.

FIG. 26 is an exploded view of channel unit 300 illustrating the plurality of individual parts that are assembled into this particular embodiment. For one embodiment utilizing injection molded plastic parts, joints between non-moving parts may be fastened by glue, plastic welding, and/or snap fits, for example. The conduit member 301 includes an inner conduit member 316 telescopically arranged within an outer conduit member 318. An end cap 320 is fitted with an adapter 322 configured for the appropriate connectors 324 for conductor 326. FIG. 20 illustrates an embodiment utilizing an electrical conductor with RJ connectors, although alternative end cap and/or adapter designs may be configured for any desired type of conductors/connectors. Cooperating tab locks 328 may be affixed to the inner and outer conduit members 318, 320 to prevent the conduit member 301 from over-extending and pulling apart once assembled.

The adjustable corner assembly 302 includes a corner coupler 330, a center section first portion 332, a center section second portion 334, and corner coupler 336. The inner conduit member 316 is connected to the adjustable corner assembly 302 at corner coupler 330. The center section first portion 332 and second portion 334 may be fabricated from identical halves 332a, 332b and 334a, 334b respectively that are affixed together during assembly. The design of these parts provides a freedom of rotation about the longitudinal axis of the conduit members 318, 320 at joint 308 between the corner coupler 330 and center section first portion 332; a freedom of rotation about an axis disposed at a 45° angle relative to the longitudinal axis at joint 312 between the center section first portion 332 and the center section second portion 334; and a freedom of rotation at joint 310 between the center section second portion 334 and the corner coupler 336. One may appreciate that the freedom of rotation at joint 310 is about the longitudinal axis as illustrated in FIGS. 20 and 26 but may be about an axis perpendicular to the longitudinal axis when joint 312 is disposed at a right angle as illustrated in FIGS. 21, 22, 24 and 25. The freedom of rotation at joints 308 and 310 are about an axis parallel to the direction of travel of the conductor 326 through the joint.

Figure 27:
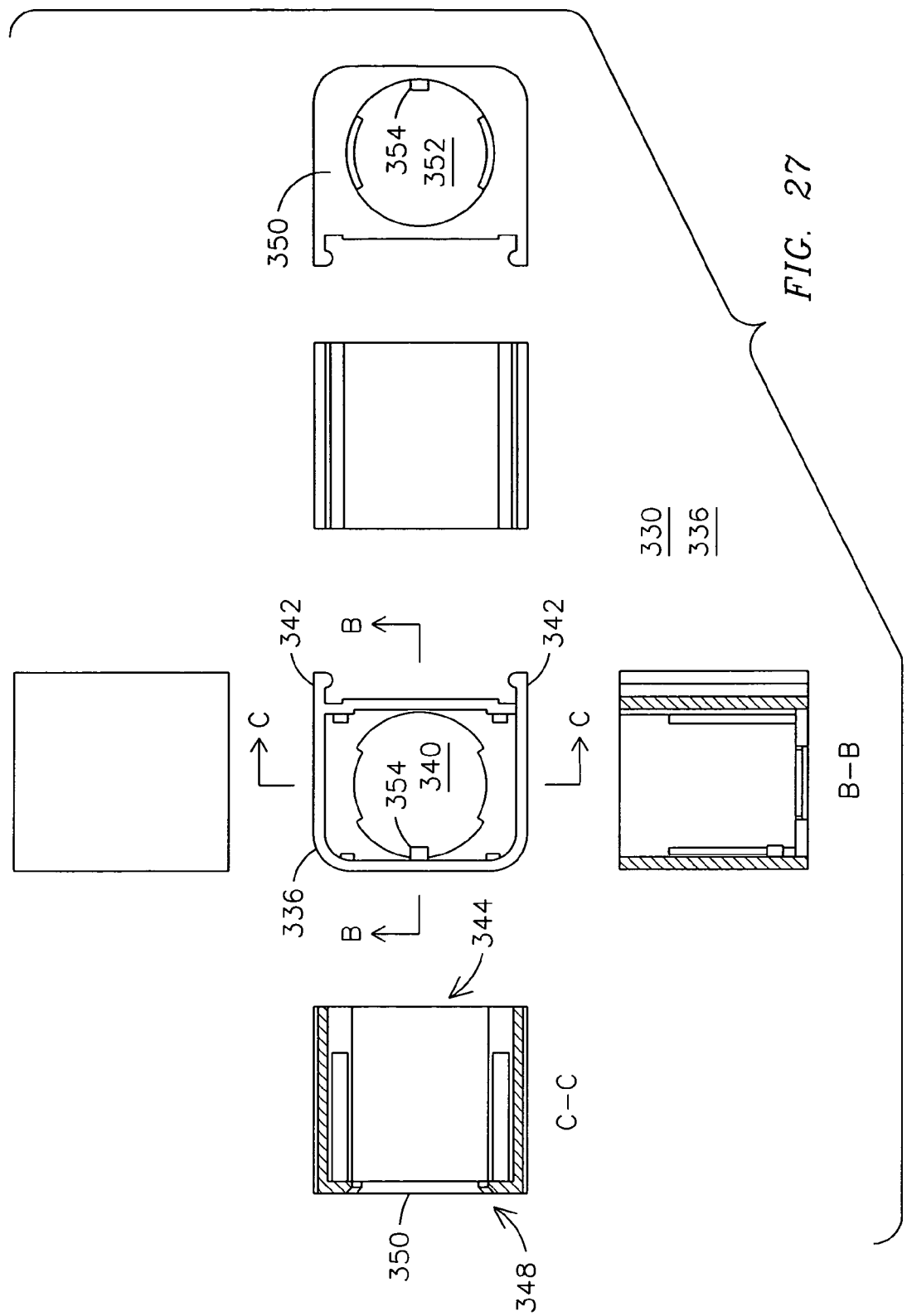
FIG. 27 illustrates various views of a corner coupler.

FIG. 27 is a group of related views of corner couplers 330, 336, which in the embodiment of FIGS. 19–26 are identical. The outer wall member 338 defines a center cavity 340 for receiving the conductor 326 and extends to form gripping ledges 342 for engaging a wall mounting unit (now shown). A first end 344 of the coupler 330, 336 is open for receiving either the inner conduit member 316 or male end cap 344. A second end 348 is defined by end wall 350 including opening 352. A stop member 354 is connected to the outer wall member 338 for limiting rotation about joint 308, 310, as will be described more fully later.

Figure 28:
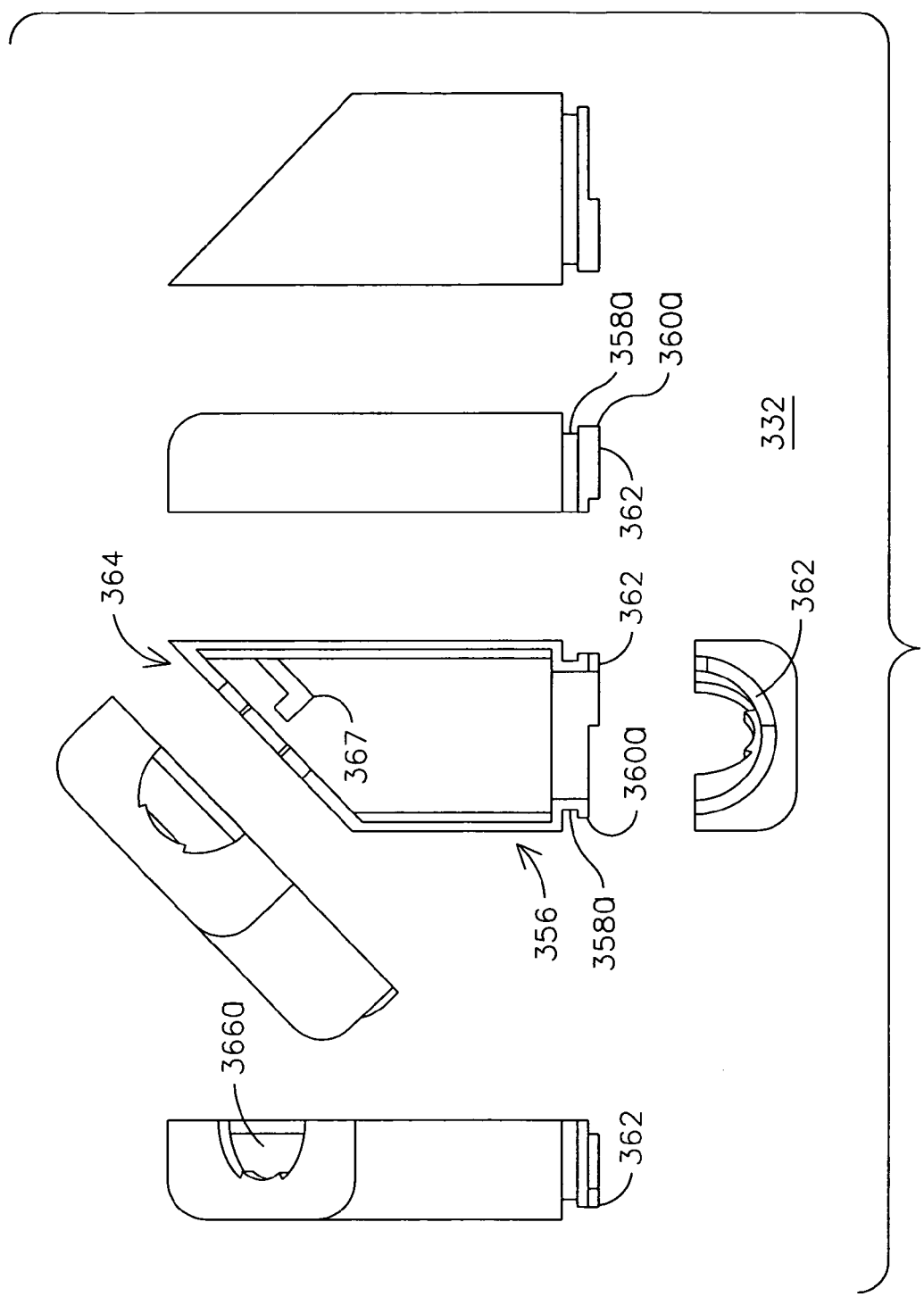
FIGS. 28–31 contain various views of respective corner halves.
Figure 29:
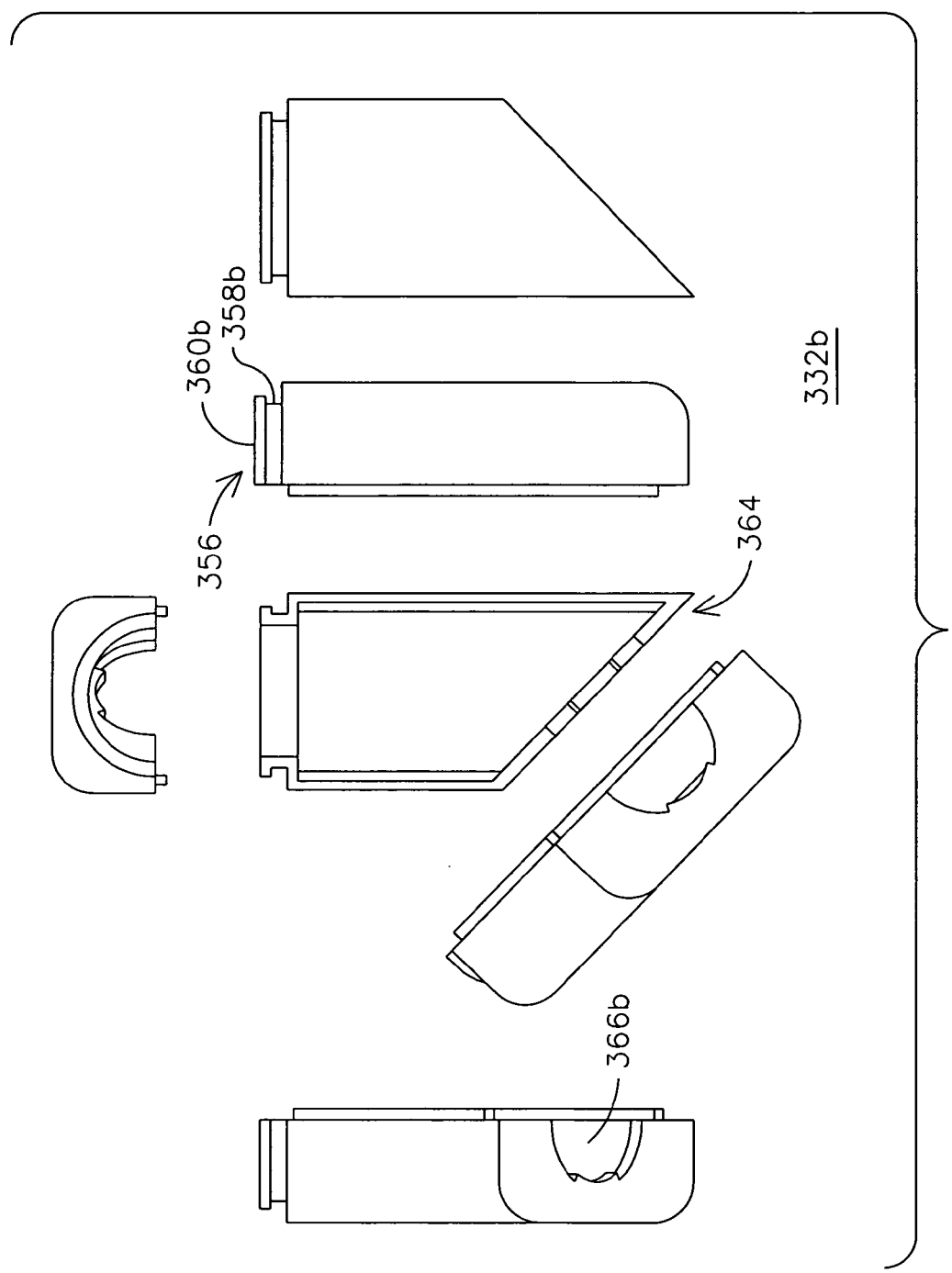

Details of the construction of center section first portion 332 are illustrated in FIGS. 28 and 29 for halves 332a and 332b respectively. Center section first portion 332 includes a first end 356 having a protruding collar 358a, 358b (referred to as 358 in their assembled configuration) including a raised rim portion 360a, 360b (referred to as 360 in their assembled configuration). The collar 358 is sized to extend through the end wall opening 352 in corner coupler 330, with the rim portion 360 being larger than the opening 352 so as to capture the collar 358 within the opening 352. The circular shape of opening 352 and collar 358 provides for the freedom of rotation of joint 308. An extended portion 362 of rim portion 360 will engage the stop member 354 of corner coupler 330 in order to limit that maximum range of rotation available in joint 308 in order to avoid the twisting of conductor 326.

Center section first portion 332 also includes a second end 364 disposed at a 45° angle relative to the first end 356. The second end 364 includes a circular opening 366 formed by respective semicircular openings 366a, 366b in the respective halves 334a, 334b. Center section first portion 332 also includes a stop member 367.

Figure 30:
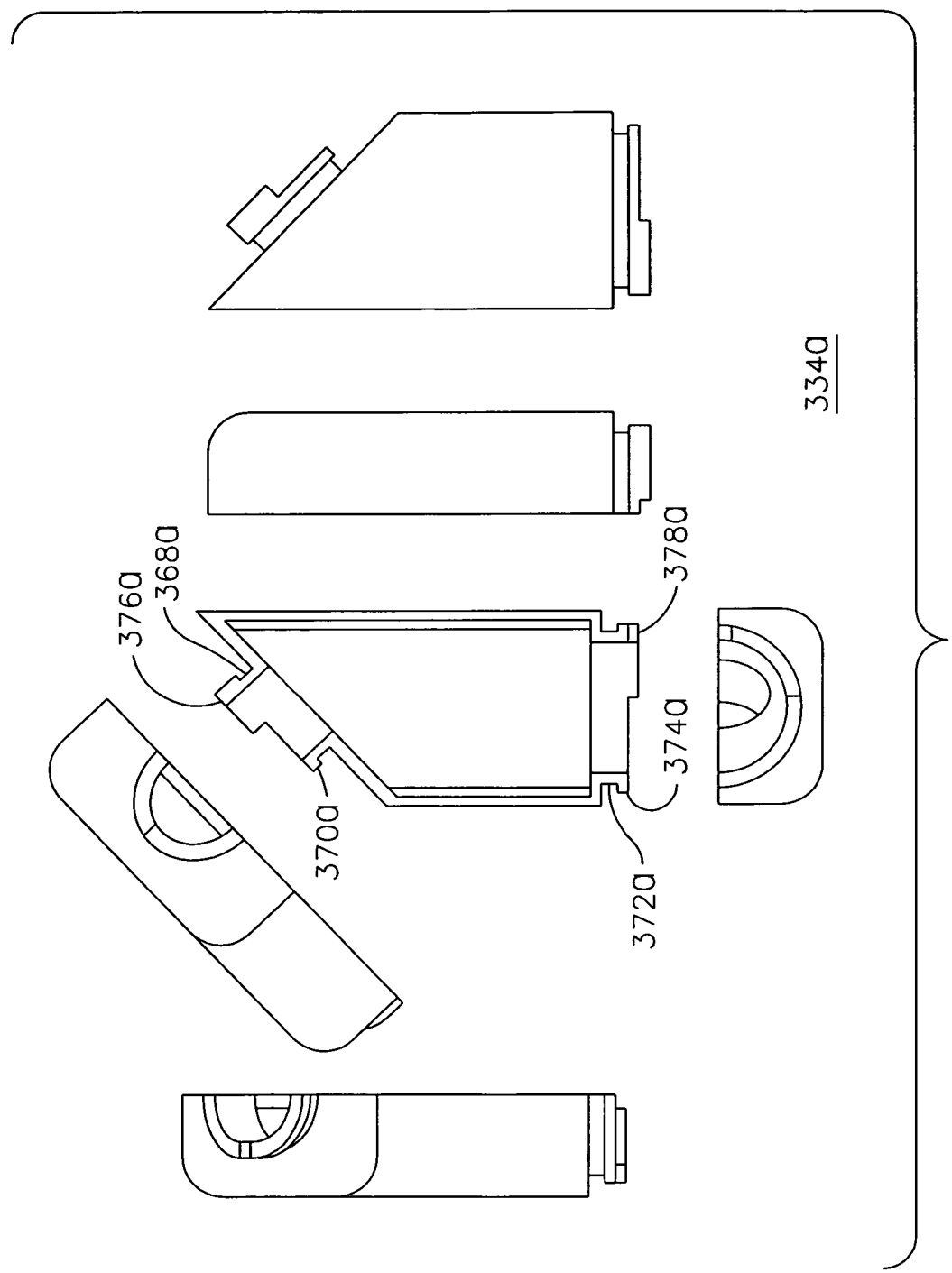
Figure 31:
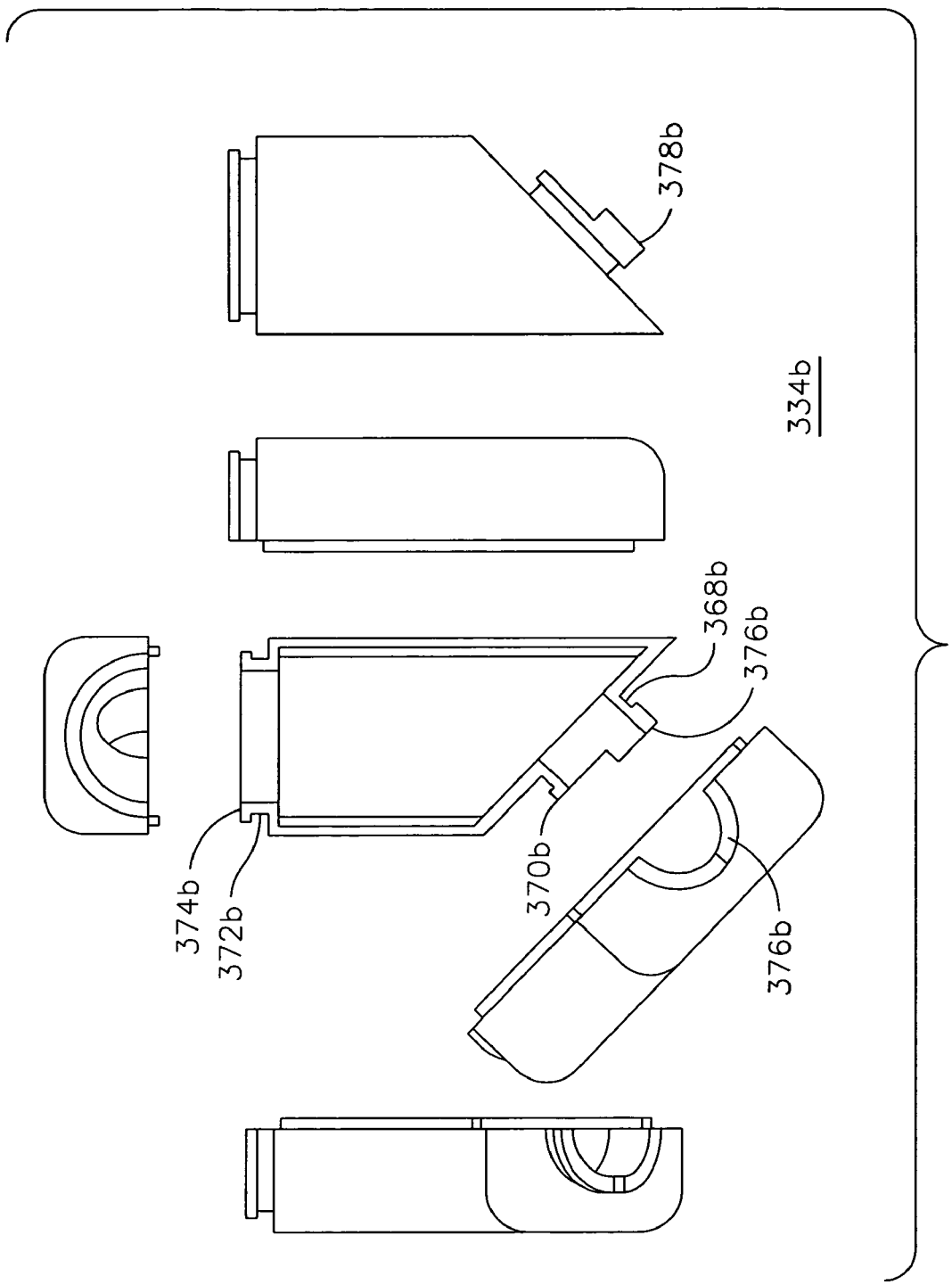

Details of the construction of center section second portion 334 are illustrated in FIGS. 30 and 31 for halves 334a and 334b respectively. The center section second portion 334 includes protruding collars 368, 370 having raised rim portions 372, 374 respectively on opposed ends. The unassembled halves of these features are marked on the drawings as 368a, 368b, 370a, 370b, 372a, 372b, 374a and 374b respectively. Collar 368 extends through opening 366 in the second end 364 of center section first portion 332, with rim portion 370 being larger than opening 366 to retain the center section first portion 332 against the center section second portion 334 to form joint 312. An extended portion 376 of rim portion 370 cooperates with stop member 367 to limit the range of rotational movement to avoid twisting of conductor 326. Collar 372 extends through opening 352 in corner coupler 336 in a similar manner to form joint 310, with an extended portion 378 of rim portion 372 cooperating with stop member 354 to limit the range of rotational movement.

Figure 32:
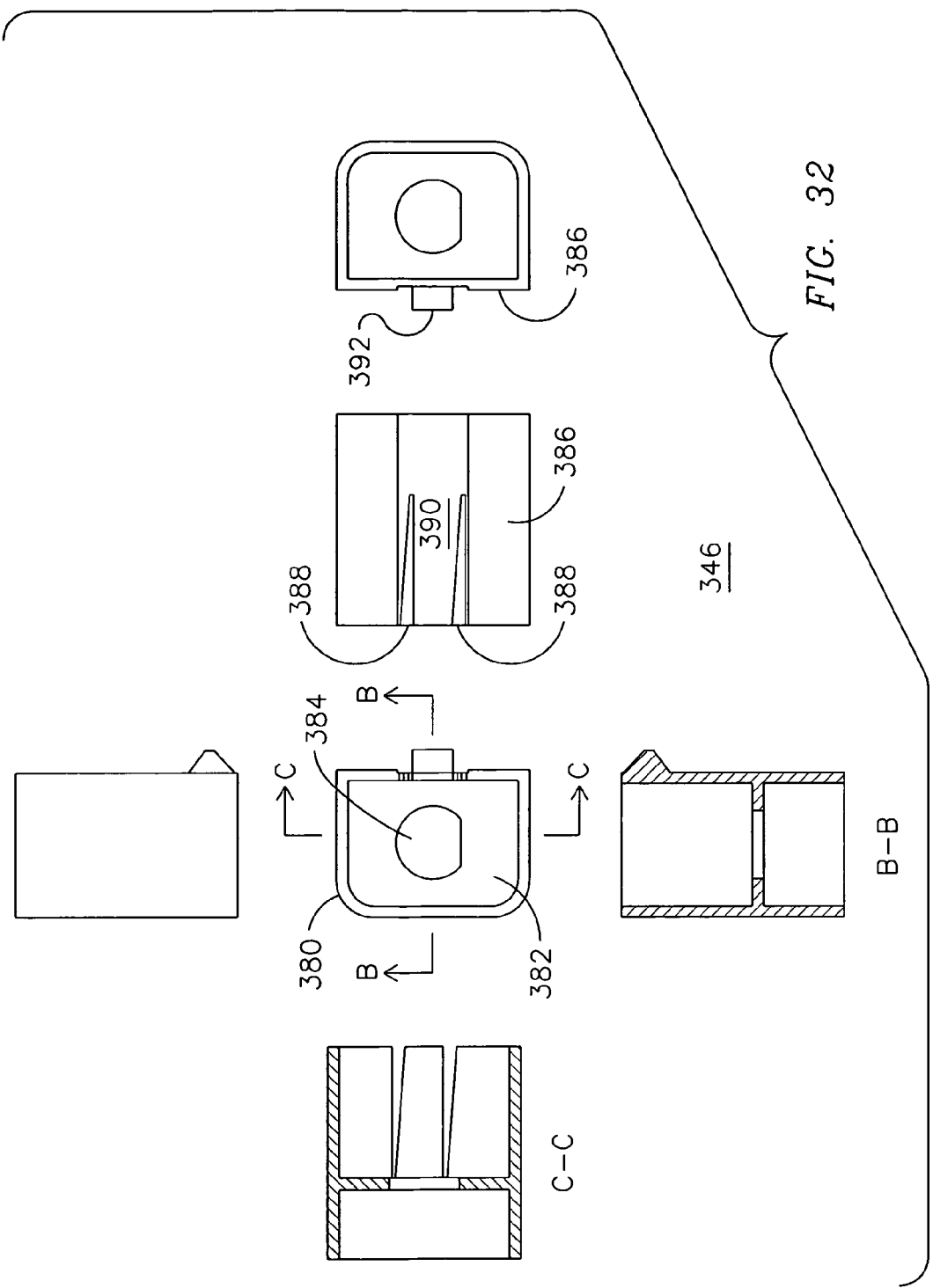
FIG. 32 illustrates various views of an endcap.

FIG. 32 illustrates the details of construction of end cap 346, called a male end cap because it's wall member 380 is sized to slide into the corner coupler 336. End cap 320 on the opposed end of the extendable channel unit 300 is called a female end cap 320 because it is sized to receive adapter 322. End cap 346 includes an end wall 382 defining an opening 384 for retaining connector 324 of conductor 326. A sidewall 386 includes slots 388 defining a flexible tab 390. The tab 390 contains a protruding lip 392 for engaging an adjacent extendable channel unit (not shown). Other designs of end caps and other types of connections between adjacent channel units may be used in other embodiments.

Figure 33:
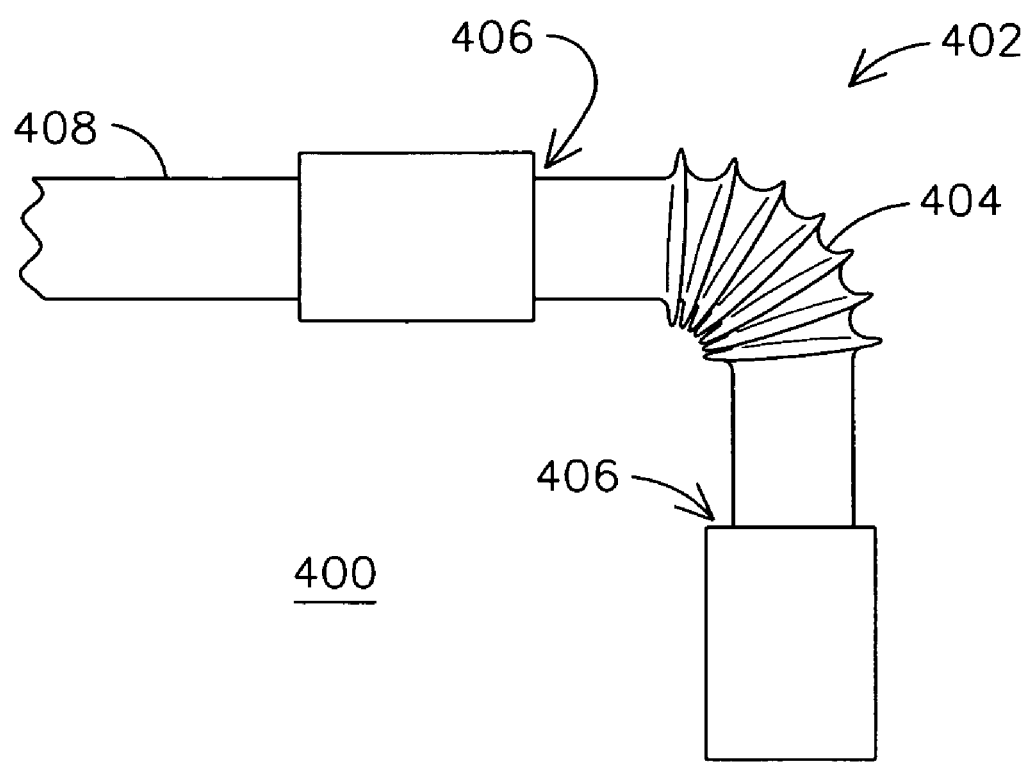
FIG. 33 is a partial top view of an extendable molding unit having an adjustable corner assembly utilizing a bellows.

FIG. 33 illustrates an embodiment of a channel unit 400 including an adjustable corner assembly 402 providing flexibility for creating bends or curves in the unit 400. The corner assembly 402 includes a flexible member such as bellows member 404 that can be manipulated to take a straight or curved shape, such as the right angle illustrated in FIG. 33. The bellows member 404 may be manipulated to a range of angles from straight to greater than 90 degrees. The flexible member may be made of metal, plastic or an elastomeric material providing the desired degree of flexibility without structural failure. The flexible member permits the selective creation of an angle relative to a longitudinal axis without the need for rotational movement. The channel unit 400 optionally may include one or more rotatable joints. The channel unit main body 408 may be of fixed length or it may be extendable along its longitudinal axis. The channel unit 400 may be provided with an installed conductor of any type or its hollow central volume may be empty to allow for the installation of a conductor after installation.

Figure 34:
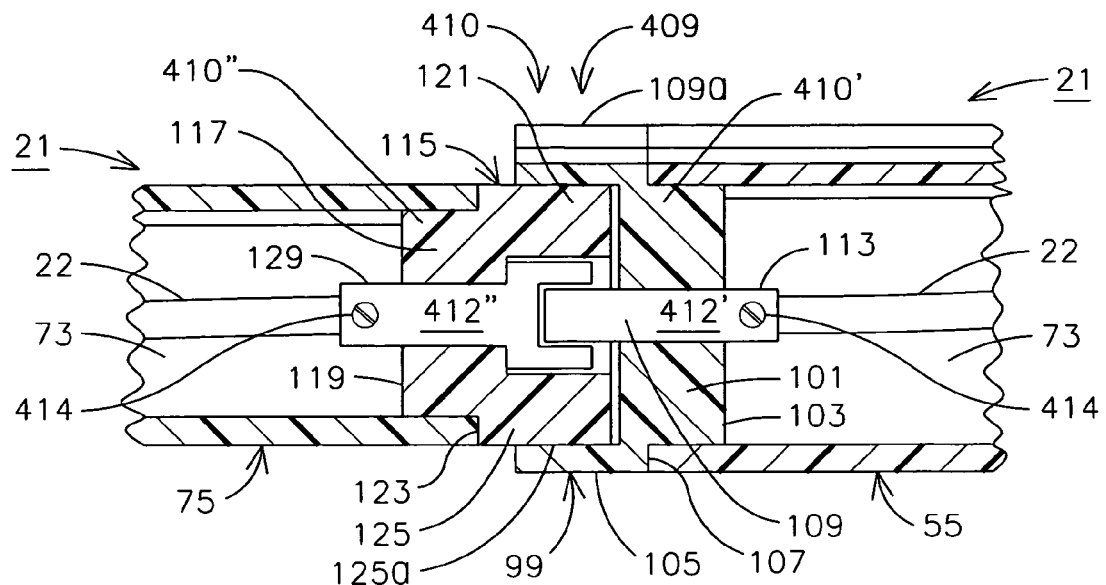
FIG. 34 is a partial cross-sectional view of a conductive end cap assembly.

FIG. 34 is a partial cross-sectional view illustrating another embodiment of the present invention showing the conductive interconnection of an adjacent pair of the extendable molding units 21 arranged in end-to-end relation. The conduit 75 of a first channel unit is interconnected to the conduit 55 of a second channel unit by an end cap assembly 409. In this embodiment, the closure walls 101, 117 of the cap assembly 409 include respective mating halves 410', 410" of a conductive plug assembly 410, here illustrated as providing a single conductive path for interconnecting conductors 22 of the two conduits 75, 55. One may appreciate that in various embodiments one or more conductive paths may be provided through such a plug assembly, such as may be desired for use in conducting electrical power, electrical signals, light signals, etc. The mating halves 410', 410" of the plug assembly 410 are formed to provide sliding connection between respective plug conductors 412', 412" when the two halves of the cap assembly 409 are joined together to interconnect conduits 75 and 55. Conduit conductors 22 may be connected to respective plug conductors 412 via fasteners such as screws 414, for example. In this manner, a conductive path may be extended along a surface by joining together two or more conduits 75, 55 of respective molding units 21 by simply plugging together the two halves of a plug assembly 410 that are attached to the respective ends of the conduits 75, 55. A "snap" mechanism such as described with respect to the cap assembly 240 of FIG. 18 may or may not be used.

Figure 35:
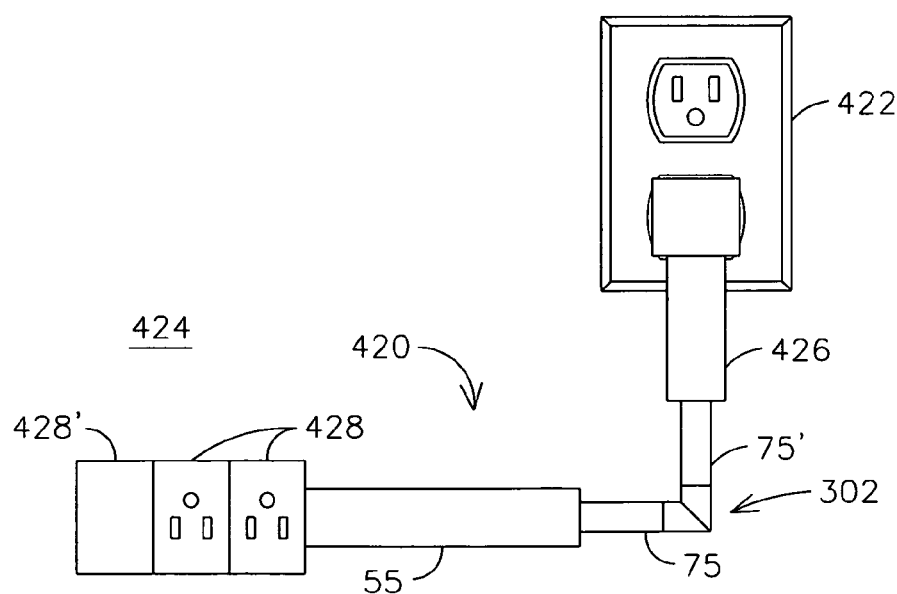
FIG. 35 is a schematic illustration of an extendable molding unit configured to deliver electrical power to a location remote from a wall outlet.

FIG. 35 illustrates an extendable molding unit 420 that is configured to selectively extend an electrical power connection from an electrical outlet 422 to a location along a surface 424 remote from the outlet 422. The molding unit 420 includes a pair of telescopically arranged conduit members 55, 75 relatively extendable with respect to each other along their longitudinal axis (here illustrated as being horizontal) to define a selectable, extendable length. Conduit 75 is connected to an adjustable corner assembly 302 as described above for directing the conductor(s) contained within the unit 420 vertically upwardly toward the outlet 422. A male plug end connector assembly 426 is connected at an end of the conduit 75' and is operable to plug into the outlet 422 for receiving electrical power. At an opposed end of the unit 420, a plurality of female plug end connectors 428 are mechanically affixed to the conduit 55 and electrically connected to the internal conductor (not shown) for providing respective outlets for the electrical power received from the outlet 422. The endmost female plug end connector 428' is arranged to have its outlet openings directed along the longitudinal axis (i.e. to the left when viewing FIG. 35, and thus not visible in that figure) in order to enable it to be plugged into an additional molding unit (not shown) configured to have a male end plug end connector with male plug elements aligned along the longitudinal axis. In this manner, electrical power may be delivered from the outlet 422 to any location along a surface 424. One may appreciate that any type of conductor may thus be extended along the surface 424, for example, signal cable, fiber optic cable, etc.

It is contemplated that various changes as to the precise arrangements, configurations and connections of the components employed in this invention may be made by those having ordinary skill in the art without departing from the spirit of the invention as set out in the claims which follow.

The invention claimed is:

1. A channel unit comprising:
   a conduit member extending along a longitudinal axis and defining a portion of a chamber;
   an adjustable corner assembly attached to the conduit member and further defining the chamber, the adjustable corner assembly comprising a first joint alternatively configurable between a straight configuration and an angled configuration with respect to the longitudinal axis; and
   a conductor disposed within the chamber and conformable to both the straight and angled configurations;
   wherein the first joint is rotatable about an axis disposed at a 45° angle relative to the longitudinal axis to selectively direct the conductor around a right angle.

2. The channel unit of claim 1, wherein the adjustable corner assembly further comprises a second joint disposed between the first joint and the conduit member, the second joint rotatable about the longitudinal axis to selectively direct an end of the right-angled conductor relative to the longitudinal axis.

3. The channel unit of claim 2, wherein the adjustable corner assembly further comprises a third joint disposed on a side of the first joint opposed from the second joint, the third joint rotatable about an axis of the end of the right-angled conductor.

4. The channel unit of claim 1, further comprising:
   a pair of telescopically arranged conduit members relatively extendable with respect to each other along the longitudinal axis and defining an extendable length for the chamber; and
   said conductor including a section arranged to accommodate a change in length of the chamber during relative extension of said conduit members.

5. The channel unit of claim 4, wherein said section of said conductor comprises a generally sinuous arrangement of said conductor within said chamber.

6. The channel unit of claim 4, wherein said section of said conductor comprises a plurality of expandable coils arranged in said conductor within said chamber.

7. The channel unit of claim 1, wherein the conductor comprises one of a signal conductor, a power conductor and a fluid conductor.

8. A channel unit comprising:
   a conduit member extending along a longitudinal axis and defining a portion of a chamber;
   an adjustable corner assembly attached to the conduit member and further defining the chamber, the adjustable corner assembly comprising a joint alternatively configurable between a straight configuration and an angled configuration with respect to the longitudinal axis; and
   a conductor disposed within the chamber and conformable to both the straight and angled configurations,
   wherein the adjustable corner assembly further comprises:
   a center section comprising a first portion and a second portion rotatably joined along respective parallel faces disposed at a 45° angle relative to the longitudinal axis;
   a first corner coupler rotatably joined to a first end of the center section at one end and to the conduit member at an opposed second end; and
   a second corner coupler rotatably joined to a second end of the center section opposed the first end.

9. The channel unit of claim 8, further comprising:
   a first circular opening formed in the face of the center section first portion;
   a collar comprising a distal rim extending from the center section first portion about the first circular opening;
   a second circular opening formed in the face of the center section second portion, the second circular opening receiving the collar and capturing the rim of the center section first portion to rotatably join the center section first portion to the center section second portion.

10. The channel unit of claim 9, further comprising:
    a stop member comprising an extension of a portion of the rim of the center section first portion; and
    the center section second portion comprising a stop member operable to engage the center section first portion stop member to limit a degree of rotational freedom between the center section first portion and the center section second portion.

11. The channel unit of claim 4, further comprising:
a circular opening formed in an end of the center section second portion;
a collar comprising a distal rim extending from the center section second portion about the circular opening;
a circular opening formed in an end of the first corner coupler for receiving the collar and capturing the rim of the center section second portion to rotatably join the center section second portion to the first corner coupler.

12. The channel unit of claim 11, further comprising:
a stop member comprising an extension of a portion of the rim of the center section second portion; and
the first corner coupler comprising a stop member operable to engage the center section second portion stop member to limit a degree of rotational freedom between the center section second portion and the first corner coupler.

* * * * *